US011645628B2

(12) United States Patent
Douglas et al.

(10) Patent No.: US 11,645,628 B2
(45) Date of Patent: May 9, 2023

(54) TRANSLATION OF TIME BETWEEN CALENDAR SYSTEMS

(71) Applicant: Microsoft Technology Licensing, LLC, Redmond, WA (US)

(72) Inventors: Malia Douglas, Seattle, WA (US); Rachel Sirkin, Seattle, WA (US); Aaron E. Erlandson, Kirkland, WA (US); Stephen White, Grand Rapids, MI (US); Peter L. Engrav, Seattle, WA (US); Erin Greenly, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/321,093

(22) Filed: May 14, 2021

(65) Prior Publication Data
US 2021/0272069 A1    Sep. 2, 2021

Related U.S. Application Data

(63) Continuation-in-part of application No. 16/414,374, filed on May 16, 2019, now Pat. No. 11,151,104.

(51) Int. Cl.
*G06Q 10/10* (2012.01)
*G06F 16/901* (2019.01)
(Continued)

(52) U.S. Cl.
CPC ..... *G06Q 10/1093* (2013.01); *G06F 16/9027* (2019.01); *G06F 16/9035* (2019.01); *G06F 16/9038* (2019.01)

(58) Field of Classification Search
CPC .. G06Q 10/10; G06Q 10/1093; G06F 16/901; G06F 16/9035; G06F 16/9038; G06F 16/9027
See application file for complete search history.

(56) References Cited

U.S. PATENT DOCUMENTS 5,845,257 A    12/1998  Fu et al.
5,874,965 A     2/1999  Takai et al.
(Continued)

FOREIGN PATENT DOCUMENTS

CN    101145223 A    3/2008
CN    101520862 A    9/2009
(Continued)

OTHER PUBLICATIONS

Date-constrained Google Search result for "universal time" and "coordinated universal time", obtained by Examiner on Mar. 10, 2022 from Google search engine. (Year: 2019).*

(Continued)

*Primary Examiner* — Shourjo Dasgupta
(74) *Attorney, Agent, or Firm* — International IP Law Group, PLLC

(57) ABSTRACT

A computer-implemented method for translating time between calendar systems is described herein. The method includes accessing a first tree structure for a first calendar system, where data corresponding to the first tree structure include time intervals for the first calendar system that are arranged into layers of nodes, and where the layers of nodes are mapped to universal time. The method also includes scheduling a calendar content item corresponding to a time fragment relative to the universal time. The method further includes translating the calendar content item to a first human-readable time fragment for the first calendar system by traversing the first tree structure corresponding to the first calendar system to convert the time fragment to the first human-readable time fragment based on the mapping of the layers of nodes of the first tree structure to the universal time.

17 Claims, 10 Drawing Sheets

(51) Int. Cl.
*G06F 16/9035* (2019.01)
*G06F 16/9038* (2019.01)
*G06Q 10/1093* (2023.01)

(56) References Cited

U.S. PATENT DOCUMENTS

| | | | |
|---|---|---|---|
| 5,970,466 | A | 10/1999 | Detjen et al. |
| 6,978,271 | B1 | 12/2005 | Hoffman et al. |
| 7,305,491 | B2 | 12/2007 | Miller et al. |
| 7,318,040 | B2 | 1/2008 | Doss et al. |
| 7,325,198 | B2 | 1/2008 | Adcock et al. |
| 7,689,448 | B2 | 3/2010 | Fu et al. |
| 7,830,751 | B2 | 11/2010 | Parees et al. |
| 8,295,126 | B2 | 10/2012 | Wood et al. |
| 8,375,292 | B2 | 2/2013 | Coffman et al. |
| 8,434,026 | B2 | 4/2013 | Stewart et al. |
| 8,510,677 | B2 | 8/2013 | van Os |
| 8,538,992 | B1 | 9/2013 | Lawyer et al. |
| 8,607,250 | B2 | 12/2013 | Oral et al. |
| 8,713,435 | B2 | 4/2014 | Guan et al. |
| 9,195,972 | B2 | 11/2015 | Gopinath et al. |
| 9,292,482 | B1* | 3/2016 | Thiesen ............... G06F 40/14 |
| 9,438,649 | B2 | 9/2016 | Tallett |
| 9,843,895 | B2 | 12/2017 | Huang et al. |
| 10,032,135 | B2 | 7/2018 | Siu et al. |
| 10,140,324 | B2 | 11/2018 | Massarella et al. |
| 10,521,084 | B2 | 12/2019 | Anzures et al. |
| 10,586,216 | B2 | 3/2020 | Miller et al. |
| 10,769,132 | B1 | 9/2020 | Sharif et al. |
| 2003/0088427 | A1 | 5/2003 | Elsey et al. |
| 2004/0104937 | A1 | 6/2004 | An |
| 2005/0039142 | A1 | 2/2005 | Jalon et al. |
| 2005/0050044 | A1* | 3/2005 | Takagi ............... G06F 16/9577 |
| 2006/0136121 | A1 | 6/2006 | Eisen |
| 2007/0005409 | A1 | 1/2007 | Boss et al. |
| 2007/0150502 | A1 | 6/2007 | Bloebaum et al. |
| 2007/0180375 | A1 | 8/2007 | Gittelman et al. |
| 2007/0180377 | A1 | 8/2007 | Gittelman et al. |
| 2007/0186193 | A1 | 8/2007 | Curran |
| 2007/0300163 | A1 | 12/2007 | Alford et al. |
| 2008/0022201 | A1 | 1/2008 | Chen et al. |
| 2008/0059618 | A1 | 3/2008 | May et al. |
| 2008/0141145 | A1 | 6/2008 | Klausmeier |
| 2008/0162234 | A1 | 7/2008 | Lu et al. |
| 2008/0177609 | A1 | 7/2008 | Grieb et al. |
| 2009/0040875 | A1 | 2/2009 | Buzescu et al. |
| 2009/0112986 | A1 | 4/2009 | Caceres |
| 2009/0168609 | A1 | 7/2009 | Weir et al. |
| 2010/0070888 | A1 | 3/2010 | Watabe et al. |
| 2010/0075648 | A1 | 3/2010 | Matsuoka et al. |
| 2010/0162105 | A1 | 6/2010 | Beebe et al. |
| 2010/0175001 | A1 | 7/2010 | Lazarus et al. |
| 2010/0330974 | A1 | 12/2010 | Balannik et al. |
| 2011/0087707 | A1* | 4/2011 | Abraham ............... G06F 16/904 707/802 |
| 2011/0216628 | A1 | 9/2011 | Nalla et al. |
| 2011/0252351 | A1 | 10/2011 | Sikora et al. |
| 2011/0264613 | A1 | 10/2011 | Yarvis et al. |
| 2011/0305437 | A1 | 12/2011 | Sakaguchi et al. |
| 2012/0084286 | A1 | 4/2012 | Hubner et al. |
| 2012/0197900 | A1 | 8/2012 | Mandre |
| 2012/0233563 | A1 | 9/2012 | Chakra et al. |
| 2013/0103658 | A1* | 4/2013 | Travis ............... G06F 16/2477 707/700 |
| 2014/0047312 | A1 | 2/2014 | Ruble et al. |
| 2014/0074536 | A1 | 3/2014 | Meushar et al. |
| 2014/0136263 | A1 | 5/2014 | Lee et al. |
| 2014/0156597 | A1 | 6/2014 | Hakami et al. |
| 2014/0330551 | A1* | 11/2014 | Bao ............... G06F 40/56 704/3 |
| 2014/0365951 | A1 | 12/2014 | Fernandes et al. |
| 2015/0156026 | A1 | 6/2015 | Gault et al. |
| 2015/0178690 | A1 | 6/2015 | May et al. |
| 2015/0199077 | A1 | 7/2015 | Zuger et al. |
| 2015/0268839 | A1 | 9/2015 | Tallett |
| 2015/0294273 | A1 | 10/2015 | Barraci et al. |
| 2015/0347982 | A1 | 12/2015 | Jon et al. |
| 2015/0378619 | A1 | 12/2015 | Maeda et al. |
| 2015/0379413 | A1 | 12/2015 | Robertson et al. |
| 2015/0379476 | A1 | 12/2015 | Chaudhri et al. |
| 2016/0104119 | A1 | 4/2016 | Von Hessberg et al. |
| 2016/0189111 | A1 | 6/2016 | Bookallil et al. |
| 2016/0203444 | A1 | 7/2016 | Frank et al. |
| 2016/0259761 | A1 | 9/2016 | Laborczfalvi |
| 2016/0275458 | A1 | 9/2016 | Meushar et al. |
| 2016/0350721 | A1 | 12/2016 | Comerford et al. |
| 2016/0364698 | A1 | 12/2016 | Bouz et al. |
| 2016/0370985 | A1 | 12/2016 | Tallett |
| 2017/0024705 | A1 | 1/2017 | Richardson et al. |
| 2018/0025323 | A1 | 1/2018 | Pintos |
| 2018/0077542 | A1 | 3/2018 | Xie et al. |
| 2018/0089632 | A1 | 3/2018 | Singh et al. |
| 2018/0095938 | A1 | 4/2018 | Monte |
| 2018/0114198 | A1 | 4/2018 | Ghotbi et al. |
| 2018/0189744 | A1 | 7/2018 | Frank et al. |
| 2018/0275846 | A1 | 9/2018 | Perret et al. |
| 2018/0336532 | A1 | 11/2018 | Hillery |
| 2018/0341924 | A1* | 11/2018 | Desportes ............... G06F 16/40 |
| 2019/0102370 | A1* | 4/2019 | Nelson ............... G06F 40/14 |
| 2019/0121994 | A1 | 4/2019 | Embiricos et al. |
| 2019/0155862 | A1* | 5/2019 | Yi ............... G06F 16/2246 |
| 2020/0363910 | A1 | 11/2020 | Engrav et al. |
| 2020/0364199 | A1 | 11/2020 | Engrav et al. |
| 2020/0364673 | A1 | 11/2020 | Engrav et al. |
| 2022/0365665 | A1 | 11/2022 | Douglas et al. |
| 2022/0366376 | A1 | 11/2022 | Douglas et al. |

FOREIGN PATENT DOCUMENTS

| | | | |
|---|---|---|---|
| CN | 105279637 | A | 1/2016 |
| CN | 109344294 | A * | 2/2019 |
| WO | 2018212879 | A1 | 11/2018 |

OTHER PUBLICATIONS

ServiceNow, "Time Configuration", published on Jul. 15, 2015 at https://docs.servicenow.com/bundle/sandiego-platform-administration/page/administer/core-configuration/concept/p_Time.html, retrieved on Mar. 10, 2022. (Year: 2015).*

Microsoft, "How to Convert UTC Time to Local Time", published on Dec. 8, 2015 at https://support.microsoft.com/en-us/topic/how-to-convert-utc-time-to-local-time-0569c45d-5fb8-a516-814c-75374b44830a, retrieved on Mar. 10, 2022. (Year: 2015).*

Earthsky, "How to translate UTC to your time", published on Jan. 1, 2018 to https://earthsky.org/astronomy-essentials/universal-time, retrieved May 3, 2022. (Year: 2018).*

Microsoft, "How to convert UTC time to local time", published on Dec. 8, 2005 to https://support.com/microsoft.com/en-US/topic/how-to-convert-utc-time-to-local-time-0569c45d-5fb8-a516-814c-75374b44830a, retrieved May 3, 2022. (Year: 2005).*

Google Calendar Help, "Use Google Calendar in different time zones", published on Jan. 11, 2016 to https://support.google.com/calendar/answer/37064?hl=en&co=GENIE.PIatform%3DDesktop, retrieved May 3, 2022. (Year: 2016).*

"Notice of Allowance Issued in U.S. Appl. No. 16/414,374", dated Jun. 23, 2021, 9 Pages.

"Google Calendar", Retrieved from: https://www.google.com/calendar/about/. Retrieved Date: Feb. 11, 2021, 2 Pages.

"International Search Report and Written Opinion Issued in PCT Application No. PCT/US20/028030", dated Jun. 2, 2020, 11 Pages.

"Notice of Allowance Issued in U.S. Appl. No. 14/220,386", dated May 6, 2016, 18 Pages.

"Final Office Action Issued in U.S. Appl. No. 15/256,666", dated Apr. 23, 2019, 14 Pages.

"Non Final Office Action Issued in U.S. Appl. No. 15/256,666", dated Nov. 16, 2018, 11 Pages.

"Final Office Action Issued in U.S. Appl. No. 16/414,317", dated Jul. 1, 2020, 17 Pages.

"Non Final Office Action Issued in U.S. Appl. No. 16/414,317", dated Jan. 7, 2020, 15 Pages.

(56) References Cited

OTHER PUBLICATIONS

Non Final Office Action Issued in US Patent Application No. dated Oct. 27, 2020, 16 Pages.
"Notice of Allowance Issued in U.S. Appl. No. 16/414,317", dated Mar. 16, 2021, 9 Pages.
"Non Final Office Action Issued In U.S. Appl. No. 16/414,367", dated Jan. 13, 2021, 17 Pages.
"Notice of Allowance Issued in U.S. Appl. No. 16/414,367", dated Mar. 12, 2021, 16 Pages.
"Non Final Office Action Issued in U.S. Appl. No. 16/414,374", dated Sep. 8, 2020, 12 Pages.
Agnantis, et al., "Intelligent Calendar Applications: A Holistic Framework based on Ontologies", In International Journal of Artificial Intelligence, vol. 14, Issue 2, Oct. 2016, 21 Pages.
Cranshaw, et al., "Calendar.help: Designing a Workflow-Based Scheduling Agent with Humans in the Loop", In Repository of arXiv:1703.08428v1, Mar. 24, 2017, 12 pages.
Hinnant, Howard, "Chrono-Compatible Low-Level Date Algorithms", Retrieved From: https://howardhinnant.github.io/date_algorithms.html, Sep. 7, 2013, 24 Pages.
Krzywicki, et al., "Closed Pattern Mining for the Discovery of User Preferences in a Calendar Assistant", In Book of Mew Challenges in Applied Intelligence Technologies, Jan. 2008, 11 Pages.
Masoodian, et al., "A Comparison of Linear and Calendar Travel Itinerary Visualizations for Personal Digital Assistants", In Proceedings of the OZCHI, the CHISIG Annual Conference on Human-Computer Interaction, Nov. 20, 2004, 10 Pages.
"International Search Report and Written Opinion Issued in PCT Application No. PCT/US20/028027", dated Jul. 20, 2020, 11 Pages.
"International Search Report and Written Opinion Issued in PCT Application No. PCT/US20/028029", dated Jul. 23, 2020, 11 Pages.
"Behavior and format of the date and time field", Retrieved from: https://docs.microsoft.com/en-us/previous-versions/dynamicscrm-2016/administering-dynamics-365/dn946904(v=crm.8)?redirectedfrom=MSDN, Nov. 28, 2016, 10 Pages.
"Using Date, Date/Time, and Time Values in Formulas", Retrieved from: https://help.salesforce.com/articleView?id=sf.formula_using_date_datetime.htm&type=5, Retrieved Date: Feb. 11, 2021, 4 Pages.
"Non Final Office Action Issued in U.S. Appl. No. 17/321,050", dated Feb. 16, 2022, 34 Pages.
"Non Final Office Action Issued in U.S. Appl. No. 17/320,991", dated Apr. 1, 2022, 13 Pages.
"Final Office Action Issued in U.S. Appl. No. 17/321,050", dated May 10, 2022, 45 Pages.
"International Search Report and Written Opinion Issued in PCT Application No. PCT/US22/024180", dated Jun. 1, 2022, 17 Pages.
"Notice of Allowance Issued in U.S. Appl. No. 17/321,050", dated Oct. 12, 2022, 9 Pages.
"International Search Report & Written Opinion issued in PCT Application No. PCT/US22/024182", dated Jul. 11, 2022, 13 Pages.
"International Search Report & Written Opinion issued in PCT Application No. PCT/US22/024321", dated Jul. 8, 2022, 13 Pages.
"Notice of Allowance Issued in U.S. Appl. No. 17/320,991", dated Aug. 19, 2022, 5 Pages.
"Office Action Issued in European Patent Application No. 20723715.7", dated Sep. 6, 2022, 8 Pages.
"Notice of Allowance Issued in U.S. Appl. No. 17/321,050", dated Feb. 1, 2023, 5 Pages.
"Notice of Allowance Issued in European Patent Application No. 20723715.7", dated Mar. 2, 2023, 8 Pages.

* cited by examiner

100

400A

400B

TRANSLATION OF TIME BETWEEN CALENDAR SYSTEMS

CROSS-REFERENCE TO RELATED APPLICATION

This application is a continuation-in-part of co-pending and commonly assigned U.S. patent application Ser. No. 16/414,374, filed May 16, 2019, entitled "Time Systems as Data," which is incorporated herein in its entirety by reference.

BACKGROUND

The present disclosure relates to representations of time. In particular, the present disclosure relates to representing time in a manner that allows time to be translated between multiple calendar systems.

SUMMARY

The following presents a simplified summary in order to provide a basic understanding of some aspects described herein. This summary is not an extensive overview of the claimed subject matter. This summary is not intended to identify key or critical elements of the claimed subject matter nor delineate the scope of the claimed subject matter. This summary's sole purpose is to present some concepts of the claimed subject matter in a simplified form as a prelude to the more detailed description that is presented later.

In an embodiment described herein, a computer-implemented method for translating time between calendar systems is described. The method includes accessing a first tree structure for a first calendar system, where data corresponding to the first tree structure include time intervals for the first calendar system that are arranged into layers of nodes, and where the layers of nodes are mapped to universal time. The method also includes scheduling a calendar content item corresponding to a time fragment relative to the universal time. The method further includes translating the calendar content item to a first human-readable time fragment for the first calendar system by traversing the first tree structure to convert the time fragment to the first human-readable time fragment based on the mapping of the layers of nodes of the first tree structure to the universal time.

In another embodiment, a computing system is described. The computing system includes a processor for executing computer-executable instructions that cause the processor to access a first tree structure for a first calendar system, where data corresponding to the first tree structure include time intervals for the first calendar system that are arranged into layers of nodes, and where the layers of nodes are mapped to universal time. The computer-executable instructions also cause the processor to schedule a calendar content item corresponding to a time fragment relative to the universal time. The computer-executable instructions further cause the processor to translate the calendar content item to a first human-readable time fragment for the first calendar system by traversing the first tree structure to convert the time fragment to the first human-readable time fragment based on the mapping of the layers of nodes of the first tree structure to the universal time.

In another embodiment, a computer-readable storage medium is described. The computer-readable storage medium includes computer-executable instructions that, when executed by a processor of a computing system, cause the processor to access a first tree structure for a first calendar system, where data corresponding to the first tree structure include time intervals for the first calendar system that are arranged into layers of nodes, and where the layers of nodes are mapped to universal time. The computer-readable storage medium also includes computer-executable instructions that cause the processor to schedule a calendar content item corresponding to a time fragment relative to the universal time. The computer-readable storage medium further includes computer-executable instructions that cause the processor to translate the calendar content item to a first human-readable time fragment for the first calendar system by traversing the first tree structure to convert the time fragment to the first human-readable time fragment based on the mapping of the layers of nodes of the first tree structure to the universal time.

The following description and the annexed drawings set forth in detail certain illustrative aspects of the claimed subject matter. These aspects are indicative, however, of a few of the various ways in which the principles of the innovation may be employed and the claimed subject matter is intended to include all such aspects and their equivalents. Other advantages and novel features of the claimed subject matter will become apparent from the following detailed description of the innovation when considered in conjunction with the drawings.

BRIEF DESCRIPTION OF THE DRAWINGS

The following detailed description may be better understood by referencing the accompanying drawings, which contain specific examples of numerous features of the disclosed subject matter.

DETAILED DESCRIPTION

Figure 1:
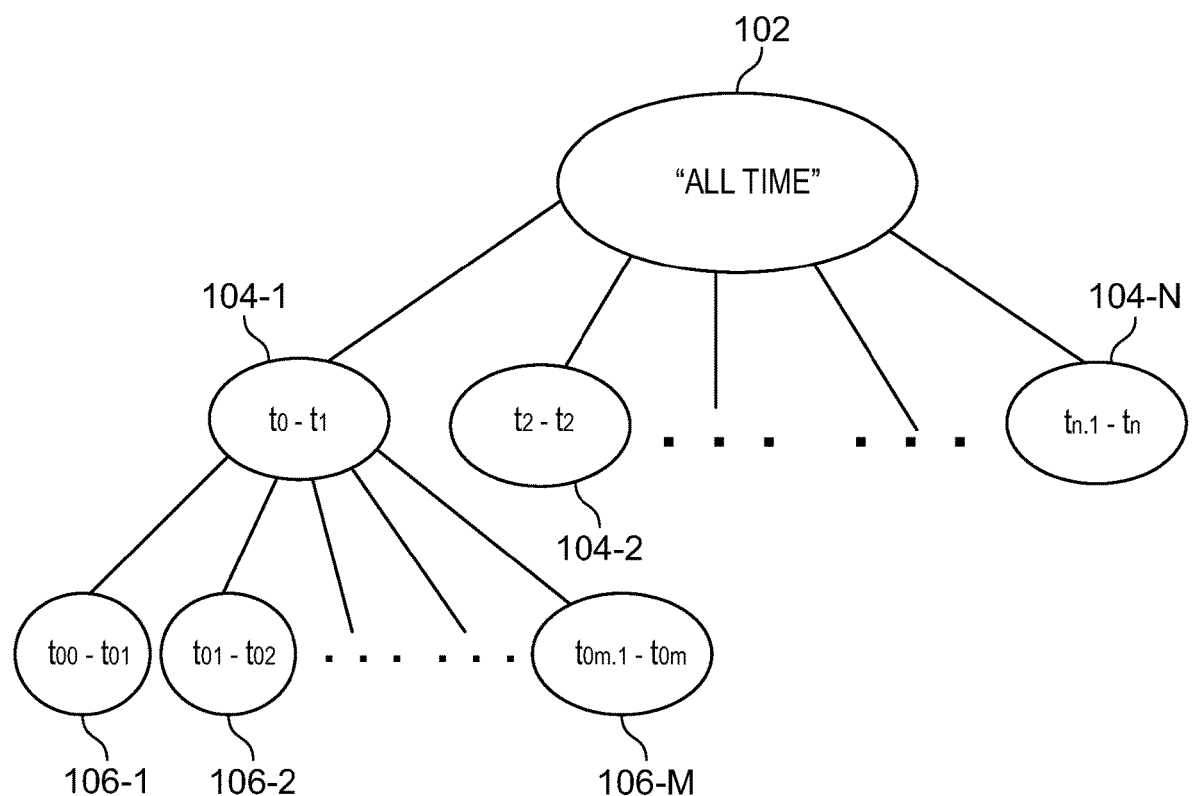
FIG. 1 is a tree structure with all time as data.

Generally, time is an irreversible sequence of existence. Humans use various calendar systems to measure time, both past time values and present time values. Electronic devices (or computing systems) are configured with a concept of time, typically referred to as system time that is measured by a system clock. Thus, the system time is representative of the passing of time as measured by the computing system. Computing systems generally represent system time primarily as the amount of time (or ticks) past a particular epoch. For example, computing systems often use 12:00 AM UTC, Jan. 1, 1970 as an epoch start, and 1 second as a tick mark. Traditionally, human-readable time is calculated by taking this tick mark and applying a set of predefined equations to produce the human-readable time.

A second is a base unit of time derived from the rotation of the Earth. Other measures of time, such as minutes, hours, days, and years are based on the revolution/rotation of the Earth. Variability in the rotation/revolution of the Earth results misalignment between the actual time as presented by movement of the Earth and human-readable time as organized by calendar systems. Leap values, such as a leap second, leap day, and a leap year, serve as a correction mechanism added to the human calendars to compensate for variation in the Earth's rotation, including the gradual slowing of rotation. Leap values are added as needed to keep human-readable time synchronized with the rotation of the planet.

The inconsistencies in human-readable time can overwhelm the equations used by computing systems to maintain system time. Moreover, general calculations used to realize system time often expect perfect, cyclical periods of time. These expectations often make it difficult to enable conversions between system time to particular representations of human-readable time, which are generally referred to as "calendar systems."

Accordingly, the present techniques enable time as data. In various embodiments, time corresponding to a particular calendar system can be stored in a lookup table format indexed on seconds of an epoch. By representing time via the table indexed on the epoch, the table may then be queried using a particular timestamp to retrieve an associated label. In some embodiments, the label includes a human-readable time corresponding to the timestamp, meaning that the label is descriptive and is immediately understood by humans as a particular time corresponding to the calendar system. For example, the label may be a particular year, month, and/or day (e.g., date) corresponding to the calendar system.

According to embodiments described herein, the table corresponding to a particular calendar system is built based on a tree structure that represents all time corresponding to the calendar system. More specifically, the tree structure includes nodes representing various periods of time within the calendar system, and each node is mapped to a time within the table. The tree structure may then be compressed such that all time corresponding to the calendar system is stored using a reasonable amount of data. A user may then utilize a computing system to query the tree structure to locate a node corresponding to the number of seconds past the epoch (as represented by the timestamp), thus allowing the associated label including the human-readable time to be retrieved.

Furthermore, according to embodiments described herein, the tree structure for each calendar system is mapped to the universal (or absolute) time, which is determined based on the rotation of the Earth (e.g., the exact position of the sun and/or moon relative to the Earth). More specifically, the tree structures are constructed such that the nodes of each tree structure are mapped to the calendar-system-agnostic universal time. In various embodiments, this enables easy translation between various calendar systems, as desired by the user of the computing system. In this manner, embodiments described herein enable multiple calendar systems to be individually and/or simultaneously utilized, as described further herein. Furthermore, in various embodiments, mapping the nodes of the tree structures for various calendar systems to the universal time also enables the scheduling of calendar content items (e.g., events) in a calendar-system-agnostic manner based on individual time fragments that are based on the universal time, as described further herein.

For ease of description, the embodiments described herein are primarily illustrated with reference to the Gregorian calendar system. However, the present techniques are not limited to a particular calendar system but, rather, relate to providing universal time as data in a manner that enables a user of a computing system to easily switch between viewing and/or scheduling with relation to any number of different calendar systems. Moreover, in some cases, the user may view multiple calendar systems simultaneously according to the present techniques. Examples of particular calendar systems that may be used according to the present techniques include, but are not limited to, lunar calendar systems, solar calendar systems, religious calendar systems, and/or specific national calendar systems. Examples of other, more specific calendar systems that may be used according to the present techniques include, but are not limited to, the Julian calendar system, the Islamic calendar system, the Hindu calendar system, the Buddhist calendar system, the Hebrew calendar system, and/or the Baha'i calendar system. In addition, non-traditional and/or custom calendar systems may also be used according to the present techniques. For example, a calendar system corresponding to a fiscal year for a particular company or organization may be used. As another example, school and/or college calendar systems may be used, in which case the calendar year may be broken into customized semesters or quarters based on the academic calendar of the particular school or college. Moreover, individual time zones may be regarded as specific calendar systems. For example, for users located within North America, there may be calendar systems corresponding to the Pacific Time Zone, the Mountain Time Zone, the Central Time Zone, and the Eastern Time Zone. Furthermore, calendar systems with values that frequently change may also be used, such as, for example, the daylight savings calendar system and/or the Japanese calendar system. As will be appreciated by those skilled in the art, any number of calendar systems may also be combined into a single calendar system depending on the details of each particular implementation.

The present techniques provide several improvements over previous techniques for scheduling relative to more than one calendar system. As an example, the present techniques allow time corresponding to individual calendar systems to be expressed as data in the form of tree structures. This, in turn, allows the tree structures to be compressed such that a large amount of calendar information can be stored using a relatively small amount of data. As another example, the present techniques allow users of computing systems to easily view their calendar events relative to various calendar systems without having to manually reschedule any calendar events such that they correspond to the correct calendar system. As another example, the present techniques allow users of computing systems to simultaneously view their scheduled events (and/or other calendar content items) relative to more than one calendar system.

As a preliminary matter, some of the figures describe concepts in the context of one or more structural components, referred to as functionalities, modules, features, elements, etc. The various components shown in the figures can be implemented in any manner, for example, by software, hardware (e.g., discrete logic components, etc.), firmware, and so on, or any combination of these implementations. In one embodiment, the various components may reflect the use of corresponding components in an actual implementation. In other embodiments, any single component illustrated in the figures may be implemented by a number of actual components. The depiction of any two or more separate components in the figures may reflect different functions performed by a single actual component.

Other figures describe the concepts in flowchart form. In this form, certain operations are described as constituting distinct blocks performed in a certain order. Such implementations are exemplary and non-limiting. Certain blocks described herein can be grouped together and performed in a single operation, certain blocks can be broken apart into plural component blocks, and certain blocks can be performed in an order that differs from that which is illustrated herein, including a parallel manner of performing the blocks. The blocks shown in the flowcharts can be implemented by software, hardware, firmware, and the like, or any combination of these implementations. As used herein, hardware may include computing systems, discrete logic components, such as application specific integrated circuits (ASICs), and the like, as well as any combinations thereof.

As for terminology, the phrase "configured to" encompasses any way that any kind of structural component can be constructed to perform an identified operation. The structural component can be configured to perform an operation using software, hardware, firmware and the like, or any combinations thereof. For example, the phrase "configured to" can refer to a logic circuit structure of a hardware element that is to implement the associated functionality. The phrase "configured to" can also refer to a logic circuit structure of a hardware element that is to implement the coding design of associated functionality of firmware or software. The term "module" refers to a structural element that can be implemented using any suitable hardware (e.g., a processor, among others), software (e.g., an application, among others), firmware, or any combination of hardware, software, and firmware.

The term "logic" encompasses any functionality for performing a task. For instance, each operation illustrated in the flowcharts corresponds to logic for performing that operation. An operation can be performed using software, hardware, firmware, etc., or any combinations thereof.

As utilized herein, the terms "component," "system," "client," and the like are intended to refer to a computer-related entity, either hardware, software (e.g., in execution), and/or firmware, or a combination thereof. For example, a component can be a process running on a processor, an object, an executable, a program, a function, a library, a subroutine, and/or a computer or a combination of software and hardware. By way of illustration, both an application running on a server and the server can be a component. One or more components can reside within a process and a component can be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any tangible, computer-readable storage medium.

Moreover, as used herein, the term "computer-readable storage medium" refers to an article of manufacture. In general, computer-readable storage media are used to host, store and/or reproduce computer-executable instructions and data for later retrieval and/or execution. When the computer-executable instructions that are hosted or stored on the computer-readable storage media are executed by a processor of a computing system, the execution thereof causes, configures and/or adapts the executing computing system to carry out various steps, processes, routines, methods and/or functionalities, including the steps, processes, routines, methods, and/or functionalities described herein. Examples of computer-readable storage media include, but are not limited to, optical storage media (such as Blu-ray discs, digital video discs (DVDs), compact discs (CDs), optical disc cartridges, and the like), magnetic storage media (such as hard disk drives, floppy disks, magnetic tape, and the like), memory storage devices (such as random access memory (RAM), read-only memory (ROM), memory cards, thumb drives, and the like), and cloud storage (such as online storage services). Computer-readable storage media may deliver computer-executable instructions to a computing system for execution via various transmission means and mediums, including carrier waves and/or propagated signals. However, for purposes of this disclosure, the term "computer-readable storage media" refers specifically to non-transitory forms of computer-readable storage media and expressly excludes carrier waves and/or propagated signals.

Exemplary Representation of Time as Data for Gregorian Calendar System

As discussed above, computing systems generally represent system time primarily as the amount of ticks past a particular epoch. For example, some computing systems use 12:00 AM UTC, Jan. 1, 1970 as an epoch start, and one second as a tick mark. Traditionally the time is calculated by taking this tick mark and applying a set of predefined equations to produce the human-readable time. In embodiments, the number of tick marks may be referred to as a timestamp.

Consider a timestamp with a value in seconds representing the number of ticks since the epoch. The number of days since the epoch can be found by dividing the number of seconds since the epoch $t_{second}$ by the number of seconds in a day. There are 86,400 seconds in a day disregarding leap seconds and daylight savings time.

$$\text{Let } t_{day} = \left(\frac{t_{second}}{86400}\right)$$

$$\text{Let } t_{secondOfDay} = t_{second} \bmod 86400$$

The number of days $t_{day}$ is determined using integer division. If $t_{second}$ is the number of seconds past midnight of an epoch such as Jan. 1, 1970, $t_{day}$ is the number of days past Jan. 1, 1970. The number of days between Jan. 1, 1 AD and the epoch Jan. 1, 1970 is 719468. Note that the Gregorian calendar is indexed on 1 AD, there is no 0 AD or 0 BC, it goes straight from 1 BC to 1 AD. The year, month, and day of a system timestamp may be calculated from $t_{day}$. The hour, minute, and second of a system timestamp may be calculated from $t_{secondOfDay}$.

To calculate $t_{day}$ and $t_{secondOfDay}$, a time period called an era is found. In the example of the Gregorian calendar, an era is 400 years in length and is a smallest repeatable unit of time in the Gregorian calendar system. Recall that the Gregorian calendar system is referred to here for ease of description; however, any calendar system may be used. Years of the Gregorian calendar are not repeatable, because every four years a leap year occurs. Similarly, groups of four years are not repeatable, because every century, according to the Gregorian calendar, a leap year is skipped. Centuries do not repeat, because every four centuries the previous rule (i.e., the rule of skipping a leap year every century) is voided, and a leap year is indeed added. Accordingly, in the Gregorian calendar system, a determination of the particular era is used to determine the smallest repeatable unit of time to which a timestamp belongs.

To determine an era of a timestamp, the number of days between Jan. 1, 1 AD and the epoch Jan. 1, 1970 may be added to the number of days past Jan. 1, 1970 $t_{day}$ to obtain the number of days past Jan. 1, 1 AD corresponding to the timestamp.

$$t_{daysSince1AD} = t_{day} + 719468$$

To determine the era, divide the number of days past Jan. 1, 1 AD $t_{daysSince1AD}$ by the number of days per era, which is a consistent 146097.

$$t_{era} = \frac{t_{daysSince1AD}}{146097}$$

The floor of $t_{era}$ results in the era for a timestamp. For example, a timestamp of 1553808563 corresponds to Thursday, Mar. 28, 2019 9:29:23 PM GMT. Using the equations above, $$t_{day} = \frac{t_{second}}{86400} = 17983 \text{ and } t_{secondOfDay} = t_{second} \bmod 86400 = 77363.$$

The number of days the number of days past Jan. 1, 1 AD is $t_{daysSince1AD} = t_{dayOfEpoch} + 719468 = 737451$. Finally, the era is found by $$t_{era} = \frac{t_{daysSince1AD}}{146097} = \sim 5.04.$$

Here, the division is decimal division. If the result of decimal division in calculating $t_{era}$ is less than 0, the additional steps involving the floor function are applied to calculation of $t_{era}$. Thus, the era corresponding to the date of Thursday, Mar. 28, 2019 9:29:23 PM GMT is 5, which is the $5^{th}$ era since 1 AD (multiply 5*400 and you get 2000).

To determine the day of the era, the remainder of the number of days the number of days past Jan. 1, 1 AD is $t_{daysSince1AD}$ divided by 146097 is found as follows.

$$t_{dayOfEra} = t_{daysSince1AD} \bmod 146097$$

In the particular example of timestamp of 1553808563, $t_{dayofEra} = t_{daysSince1AD} \bmod 146097 = 6966$.

The year of the era is obtained using a function $f$ that accounts inconsistent years the form of leap years. The function $f$ is derived to calculate the year of the era from $t_{dayofEra}$. If $$f(t_{dayOfEra}) = \frac{t_{dayOfEra}}{365},$$

the particular day found is correct for the first 1460 days of an era. Put another way, the $f(t_{dayOfEra})$ has an accurate domain of [0, 1459] and a codomain of [0, 3]. However, there are 1461 (365*4+1) days for the first 4 years (recall that an era starts March 1 of a leap year). To compensate for the additional leap day, set $f(1460)=3$ and $f(1461)=4$, as 1460 is the last day of the 3rd year and 1461 is the first day of the 4th year (recall that we're 0 indexed).

Three compensator functions are derived as follows:

$$a(t_{dayOfEra}) = \frac{t_{dayOfEra}}{1460}$$

$$b(t_{dayOfEra}) = \frac{t_{dayOfEra}}{36524}$$

$$c(t_{dayOfEra}) = \frac{t_{dayOfEra}}{146096}$$

Each compensator function a, b, and c enables compensation for leap years that occur during an era. The compensator function a, enables accuracy of the $f(t_{dayOfEra})$ for 100 years, or the domain of [0, 36523] with a codomain of [0, 99]. However, $f(36524)$ yields 99, whereas it should be 100. Thus, additional compensation is enabled by compensator function b, which enables accuracy of the $f(t_{dayOfEra})$ except for the last day of the era. Without additional compensation, the domain of $f(t_{dayOfEra})$ is [0, 146095] and the codomain is [0, 399]. In particular, the last day of an era $f(146096)$ should yield 399. However, as the last day of the era yields 400 with only compensator functions a and b. Compensator function c subtracts a day, and results in a final year of the era function $f(t_{dayOfEra})$ as follows.

$$f(t_{dayOfEra}) = \frac{t_{dayOfEra} - a(t_{dayOfEra}) + b(t_{dayOfEra}) - c(t_{dayOfEra})}{365}$$

With this out of the way, let's call $f$ on $t_{dayOfEra}$, for the particular example of $t_{second} = 1553808563$:

$$t_{yearOfEra} = f(t_{dayOfEra}) = \frac{t_{dayOfEra} - a(t_{dayOfEra}) + b(t_{dayOfEra}) - c(t_{dayOfEra})}{365}$$

$$a(t_{dayOfEra}) = \frac{t_{dayOfEra}}{1460} = \frac{6966}{1460} = 4$$

$$b(t_{dayOfEra}) = \frac{t_{dayOfEra}}{36524} = \frac{6966}{36524} = 0$$

$$c(t_{dayOfEra}) = \frac{t_{dayOfEra}}{146096} = \frac{6966}{36524} = 0$$

$$f(t_{dayOfEra}) = f(6966)$$

$$f(t_{dayOfEra}) = \frac{6966 - a(6966) + b(6966) - c(6966)}{365}$$

$$f(t_{dayOfEra}) = \frac{6966 - 4 + 0 + 0}{365}$$

$$f(t_{dayOfEra}) = \frac{6962}{365}$$

$$f(t_{dayOfEra}) = 19$$

This is correct since the start of the era was 2000, and the year of the era is 19.

The above sentence is the key to deriving the year from $t_{yearOfEra}$, which is simply to multiply $t_{era}$ by 400 (recalling that 400 is the number of years per era), and add $t_{yearOfEra}$ to the result.

$$t_{year} = t_{yearOfEra} + (400 * t_{era}) = 19 + (400*5) = 19 + 2000 = 2019$$

The day of the year can also be derived by constructing another function using two parameters, $t_{dayOfEra}$ and $t_{yearOfEra}$. Here, mod the years of the day in order to acquire the day of the year. However, leap years should be accounted for, as well as the lack of the leap year for every century other than the first century of the era. Thus, the function will add a day for every four years and subtract a day for every 100 years resulting in the following:

$$f(t_{yearOfEra}, t_{dayOfEra}) = t_{dayOfEra} - (365 * t_{yearOfEra} + a(t_{yearOfEra}) - b(t_{yearOfEra})),$$

where the following is obtained using the two compensator functions:

$$a(t_{yearOfEra}) = \frac{t_{yearOfEra}}{4}$$

$$b(t_{yearOfEra}) = \frac{t_{yearOfEra}}{100},$$

and where a represents adding a day every four years, and b represents subtracting a day every 100 years (thus counteracting a every 100 years). This equation results in a missing day from the first leap year, because the original equation relies on the years being indexed on March $1^{st}$, which makes things easier when dealing with leap years. We'll need to compensate for this later on. To obtain $t_{dayOfYearIndexedOnMarch}$ for the particular example of $t_{second}=$ 1553808563:

$$a(t_{yearOfEra}) = a(19) = 4$$

$$b(t_{yearOfEra}) = b(19) = 0$$

$$t_{dayOfYear} = f(t_{yearOfEra}, t_{dayOfEra}) = f(19,6966) = 6966 - (365*19 + a(19) - b(19)) = 6966 - (365*19 + 4 - 0) = 6966 - 6939 = 27$$

Thus, $t_{dayOfYearIndexedOnMarch} = 27$, indexed on March 1, yielding a day of human-readable time of March 28. Using similar logic, the Gregorian year, month, day, hour, minute, and second can be calculated from the timestamp $t_{second}=$ 1553808563. In particular, $t_{dayOfYear}$ and $t_{monthOfYear}$ can be derived as indexed on March 1. For $t_{monthOfYear}$, a function is created that takes in $t_{dayOfYearIndexedOnMarch}$, which has a domain of [0,366] and map it to a codomain of [0, 11]. An inverse function $f^{-1}$ that takes as input $t_{monthOfYearIndexedOnMarch}$ and outputs the starting day of the year (indexed on March $1^{st}$ as well). In particular, the function can be hard coded as follows:

$f^{-1}(0) = 0;$ $f^{-1}(1) = 31;$ $f^{-1}(2) = 61;$ $f^{-1}(3) = 92;$ $f^{-1}(4) = 122;$ $f^{-1}(5) = 153;$ $f^{-1}(6) = 184;$ $f^{-1}(7) = 214;$ $f^{-1}(8) = 245;$ $f^{-1}(9) = 275;$ $f^{-1}(10) = 306;$ $f^{-1}(11) = 337;$

The resulting function is a polynomial that maps as follows:

$$f^{-1}(t_{monthOfYearIndexedOnMarch}) = m t_{monthOfYearIndexedOnMarch} + b$$

The equation $$f^{-1}(t_{monthOfYearIndexedOnMarch}) = \frac{306 * t_{monthOfYearIndexedOnMarch} + 4}{10}$$

uses Euclidean division. The inverse, $f$, is derived as follows:

$$t_{dayOfYearIndexedOnMarch} = f^{-1}(t_{monthOfYearIndexedOnMarch})$$

$$t_{dayOfYearIndexedOnMarch} = \frac{306 * t_{monthOfYearIndexedOnMarch} + 4}{10}$$

$$t_{monthOfYearIndexedOnMarch} = \frac{10 * t_{dayOfYearIndexedOnMarch} - 4}{306} = \frac{5 * t_{dayOfYearIndexedOnMarch} - 2}{153}$$

$$t_{monthOfYearIndexedOnMarch} = f(t_{dayOfYearIndexedOnMarch}) = \frac{5 * t_{dayOfYearIndexedOnMarch} - 2}{153}$$

The result is found as follows:

$$t_{monthOfYearIndexedOnMarch} = f(t_{dayOfYearIndexedOnMarch}) = f(27) = \frac{5 * 27 - 2}{153} = \frac{133}{153} = 0$$

The $t_{monthOfYear}$ may be calculated by checking if $t_{monthOfYearIndexedOnMarch}$ is less than 10. If $t_{monthOfYearIndexedOnMarch}$ is less than 10, 3 is added to $t_{monthOfYearIndexedOnMarch}$. If $t_{monthOfYearIndexedOnMarch}$ is not less than 10, 9 is subtracted from $t_{monthOfYearIndexedOnMarch}$. In this manner, the month of the year is indexed on January, with an index of 1 instead of 0. This calculation is in accordance with Gregorian standard. This check of $t_{monthOfYearIndexedOnMarch}$ will affect the calculation of $t_{year}$.

In the example above, $t_{monthOfYearIndexedOnMarch}$ is 0, so 3 is added.

$$t_{monthOfYear} = 0 + 3 = 3$$

The day of the month, $t_{dayOfMonth}$, is derived by simply subtracting the result from $f^{-1}(t_{monthOfYearIndexedOnMarch})$ from $t_{dayOfYearIndexedOnMarch}$, and adding 1. A value of 1 is added given that the Gregorian calendar is 1 indexed, not 0 indexed.

$$t_{dayOfMonth} = t_{dayOfYearIndexedOnMarch} - f^{-1}(t_{monthOfYearIndexedOnMarch}) + 1 = 27 - f^{-1}(0) + 1 = 28$$

Finally, the $t_{year}$ is determined. To calculate the year, the number of years at the start of $t_{era}$ are acquired, and then $t_{era}$ is multiplied by the number of years per era, or 400, and this result is added to $t_{yearOfEra}$. A check is performed to see if $t_{monthOfYear}$ is less than or equal to 2. If $t_{monthOfYear}$ is less than or equal to 2, a value of 1 is added to the result to compensate for the calculations based the use of March as an index. In the present example, $t_{monthOfYear} > 2$, so 1 is not added to the calculation of $t_{year}$.

$$t_{year} = t_{era} * 400 + t_{yearOfEra} + 0 = 5 * 400 + 19 = 19$$

In this manner, the year, month, and day are obtained as 2019, 3, and 28, respectively. To acquire the hour, minute, and second, recall the value $t_{secondOfDay}$. Note that there are 3600 seconds per hour (ignoring leap seconds), so to calculate $t_{hour}$, the seconds of the day $t_{secondOfDay}$ are divided by 3600. Following the previous example:

$$t_{hour} = \frac{t_{secondOfDay}}{3600} = \frac{77363}{3600} = 21$$

The remained of the integer division in calculating $t_{hour}$ is added to the seconds of the hour $t_{secondOfHour}$. Following the previous example:

$$t_{secondOfHour} = t_{secondOfDay} \bmod 3600 = 77363 \bmod 3600 = 1763$$

Recalling there are 60 seconds to a minute, $t_{secondOfHour}$ may be divided by 60, and determined as follows:

$$t_{minuteOfHour} = \frac{t_{secondOfHour}}{60} = \frac{1763}{60} = 29$$

The remainder of the integer division used to calculate $t_{minuteOfHour}$ is assign the seconds of the minute, $t_{secondsOfMinute}$. Following the previous example:

$$t_{secondOfMinute} = t_{secondOfHour} \bmod 60 = 1763 \bmod 60 = 23$$

Accordingly, the hour, minute, and second values are calculated as 21, 29, and 23, respectively. Thus, using the above example, the Gregorian year, month, day, hour, minute, and second are calculated from an initial value of $t_{secondOfEpoch}=1553808563$, turning out to be Mar. 28, 2019, 21:29:23.

Calculations to convert timestamps to human-readable time, such as those described above, ignore the concept of leap seconds as a compensation for inconsistent real-world time. Different electronic systems are equipped with varying techniques to compensate for leap seconds in a number of different ways. For example, when a leap second is announced some systems are configured to increase the length of a second by a small amount of time, fitting 86401 seconds in the space of 86400. Other systems simply repeat the second, while other systems freeze the time for the duration of a real-world second. However, these approaches all make it appear as though nothing ever happened, so querying the calendar system will deceive the user, showing there to only be 86400 seconds in that day, whereas there were 86401. By contrast, the present techniques structure time as data by configuring time as a tree structure. In particular, the present techniques use cycles presented by calendar systems to compress a tree structure with "All-Time" as data to a manageable number of nodes. Non-cyclical nodes in the tree may be further compressed into a linear data structure, such as a table.

Exemplary Tree Structures for Representing Time as Data for Particular Calendar Systems FIG. 1 is a tree structure 100 with all time as data. In FIG. 1, root node 102 represents All-Time. The second level 104 of tree 100 represents one billion-year units of time. Thus, each node represents a billion-years, and each node is exactly alike but for the real-world time period the node represents. Each of node 104-1, node 104-2 . . . 104-N represents a time period of one billion-years. Each billion-year node can be further divided into a number of 100 million-year notes. Accordingly, the third level 106 of tree 100 includes a plurality of nodes, where each node represents 100 million-years. Each of node 106-1, node 106-2 . . . 106-M represents a time period of 100 million-years. For ease of illustration, the tree 100 illustrates three levels of hierarchical time data. However, the table may have any number of layers with nodes that further divide time into increasingly smaller intervals.

Accordingly, the tree structure 100 may continue with child nodes that replicate across all time down to units of 10,000 years. For nodes with intervals greater than 10,000 years, the intervals are identical. Further, the layer of nodes with intervals of 10,000-year blocks of time are also all identical. In the Gregorian calendar system, the arrangement of time causes time periods of less than 400 years to exhibit non-cyclical behavior due to the correction employed by leap values. Since 10,000 is evenly divisible by 400, a 10,000-year block of time is cyclical. However, a 1,000-year block of time is not cyclical since it is not evenly divisible by 400. As a result, for nodes of the tree that have intervals below 10,000 years, every other millennium has a different amount of days due to leap days. Thus, to divide the 10,000-year nodes, two types of nodes are defined—leap or normal—and the nodes of the millennia layer are not identical. Construction of the tree may continue down to years having 12 children of 28, 29, 30, or 31 days, after which the division of time results in consistent 24-hour nodes, each with 60-minute nodes, each with 60 second nodes. For ease of description, the present techniques are described using the Gregorian calendar system as an example. However, the present techniques may apply to any calendar system. Each calendar system may have a threshold interval size, wherein intervals less than this threshold interval size cease to be identical intervals. In the example of the Gregorian calendar system, this value is a multiple of 400.

Thus, time may be configured as a hierarchical tree structure, where each node has a time value and references to child nodes. In particular, the root node corresponds to all time. Each level includes a plurality of nodes that generally correspond to the same time unit. In most circumstances, sibling nodes are identical. However, for some sibling nodes, leap values are applied, rendering slight differences in time units of certain nodes. A cousin node may match other cousin nodes, where a cousin node is a node of the same layer with a different parent node.

The tree 100, which includes intervals of time in seconds, may be queried using the number of seconds since the epoch $t_{second}$, and searching for the billion-year node that contains it. The child nodes underneath the identified billion-year node may be queried to determine which 100 million-year node contains it, and so on. The complexity of this search is O(log(n)), but given that the height and width of the tree is limited, it is for all intents and purposes O(1).

Storing the data for an "All time" tree in memory is unfeasible. Accordingly, the tree may be compressed using a linear data structure, such as a table. In particular, each node is assigned an identification (ID) in a table that contains all of the node's information. For example, Table 1 below illustrates node IDs for nodes illustrated in FIG. 2.

TABLE 1

| ID | Node |
|---|---|
| 0 | All-Time |
| 1 | $t_0$-$t_1$ |
| 2 | $t_1$-$t_2$ |
| ... | ... |
| N | $t_{n-1}$-$t_n$ |

Each node is also associated with a label identification (ID). The label ID is a descriptive term that corresponds to the time interval associated with the node. The label may be, for example, a year, month, and day, or a particular date.

The cyclical nature of time data can be used to compress the tree to a manageable count of nodes. Many of these nodes are similar, such that the similar nodes include the same values and data. In embodiments, similar nodes are nodes that correspond to the same interval length. In examples, the billion-year nodes are used as a starting point for compression, as the root node of "All Time" is largely conceptual. However, in some embodiments, billion-year nodes are also compressed.

The first layer of nodes after the billion-year nodes are 100 million-year nodes. Note that all child nodes of the billion-year nodes match and are identical to their cousin nodes. Instead of repeating cousin nodes over and over again, an ID is assigned to each node listed in the table. Thus, for a set of sibling million-year nodes, the first child's start second is 0 and end second is 3,150,569,520,000,000−1; the second child's start second is 3,150,569,520,000,000 and end second is 6,301,139,040,000,000−1; and so on. Each billion-year node has the same set of children, with the same time intervals, and follows this pattern. Moreover, each 100 million-year node will have the same set of children, with the same time intervals, and so on.

Figure 2:
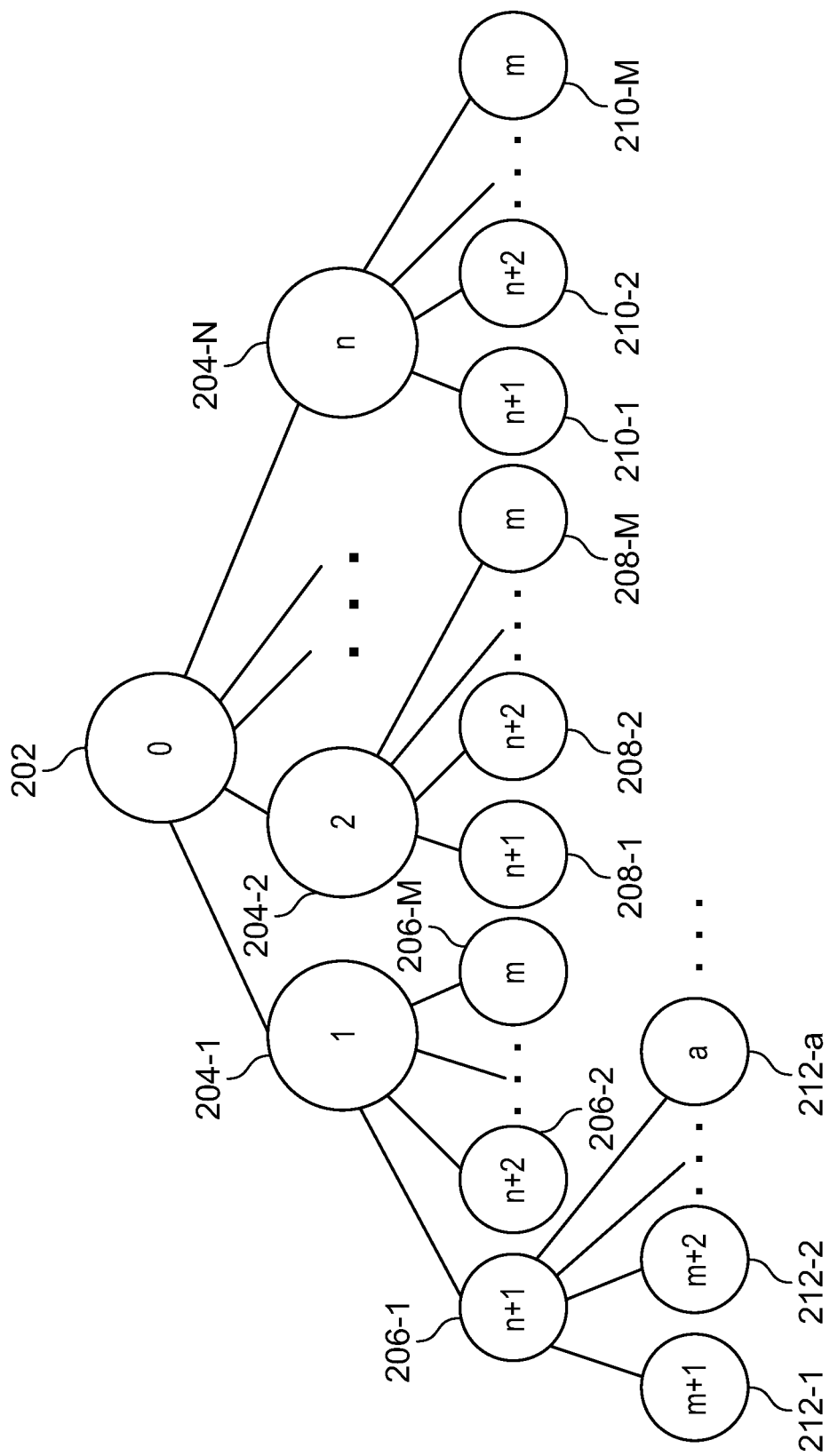
FIG. 2 is a tree structure with cyclic time periods as data.

FIG. 2 is a tree structure 200 with cyclic time periods as data. The Table 1 above corresponds to the tree 200. In various embodiments, the first layer includes a root node 202, which has an ID of zero. The second layer of the tree structure 200 may correspond to a plurality of billion-year nodes 204. Each billion-year node 204-1, 204-2, through 204-N is a parent of an identical set of sibling 100 million-year nodes 206 in the third layer. Accordingly, the third layer includes repeating 100 million-year nodes 206. In particular, parent node 204-1 with an ID of 1 has child nodes 206-1, 206-2 through 206-M. Parent node 204-2 with an ID of 2 has child nodes 208-1, 208-2 through 208-M. Finally, parent node 204-N with an ID of N has child nodes 210-1, 210-2 through 210-M. Further, each 100 million-year node is a parent of an identical set of sibling 10 million-year nodes 212 within the fourth layer. As illustrated, parent node 206-1 with an ID of n+1 has child nodes 212-1, 212-2 through 212-a. This pattern of repeating children occurs down through increasingly smaller time periods until a millennia level of nodes, using the Gregorian calendar system as an example.

Due to the repeating nature of large time periods as described above, instead of each node having its own set of children, all nodes share their children with their sibling nodes. The sharing of nodes results in a compression of a table of nodes and IDs down to a single column.

Figure 3:
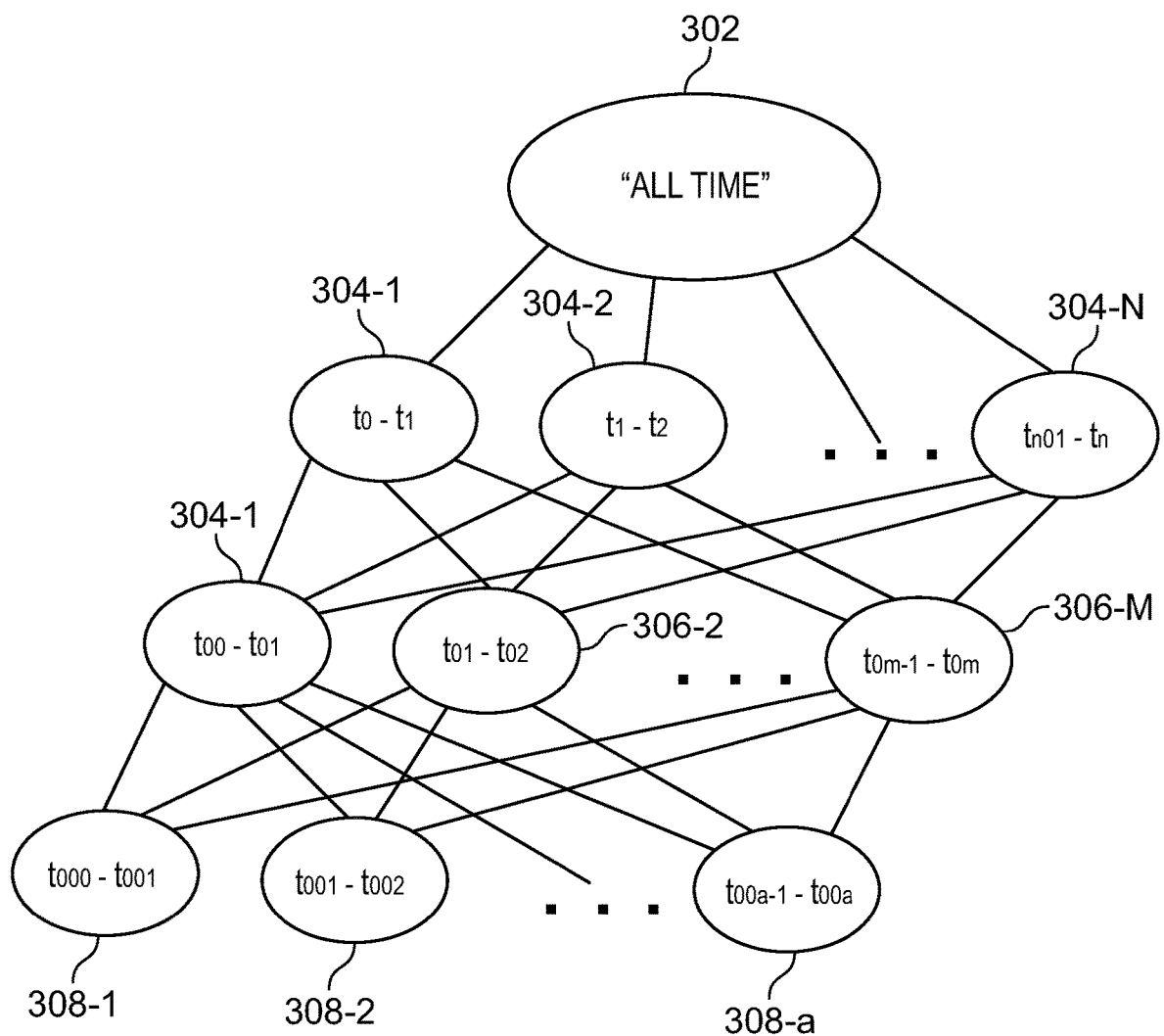
FIG. 3 is a tree structure with time periods as data with shared child nodes.

FIG. 3 is a tree structure 300 with time periods as data with shared child nodes. As illustrated, the first layer corresponds to a root node 302, which represents all time. The second layer of the tree structure 300 may correspond to billion-year nodes 304. The third layer of the tree structure 300 may correspond to 100 million nodes 306. The fourth layer of the tree structure 300 may correspond to 10 million-year nodes 306.

As illustrated, each billion-year node 304-1, 304-2, through 304-N shares sibling nodes 306-1, 306-2 through 306-M. Moreover, each 100 million-year node 306-1, 306-2, through 306-M shares sibling nodes 308-1, 308-2, through 308-A. This configuration of repeatable periods of time as a tree structure with shared sibling nodes results in a manageable count of data nodes. Moreover, to compensate for leap values, the repeating nature of larger time periods can be exploited. In particular, a time node of a tree structure according to the present techniques has start and end times of $t_{startSecond}$ and $t_{endSecond}$, with $t_{startSecond} < t_{endSecond}$. The definition of before, containing, and after with regard to a time node are as follows: (1) a time node is before a second $t_{second}$ if and only if $t_{endTime} < t_{second}$; (2) a time node contains a second $t_{second}$ if and only if $t_{startSecond} \leq t_{second} \leq t_{endSecond}$; and (3) a time node is after a second $t_{second}$ if and only if $t_{endSecond} < t_{second}$. Moreover, the length of a node N is $t_{endSecond} - t_{startSecond} + 1$.

To query a tree structure with time periods as data with shared child nodes, an offset is used to traverse the tree using a tree search algorithm. For example, consider the $t_{second}$ used earlier to obtain a human-readable date from a timestamp. Recall $t_{second}$=1553808563. In this example, set a node variable, N, to the "All-time" node. In embodiments, the "All-time" node serves an entry point for querying the tree. The "All-Time" node is all encompassing, from −8.64 quadrillion seconds to 8.64 quadrillion seconds. Thus, the "All-Time" node includes $t_{second}$.

Next, the billion-year node that contains $t_{second}$ is found. In various embodiments, the tree traversal iterates through the set of nodes under "All time" until the node that contains $t_{second}$ is discovered. If the nodes are ordered, a binary search may be performed to discover the billion-year node that includes $t_{second}$. As described above, the billion-year nodes according to the present techniques have absolute time, and do not use the compression techniques of smaller nodes. A node with $t_{startSecond}$ of −62167219200 and $t_{endSecond}$ of 31556889832780799 includes $t_{second}$=1553808563. Note that the value $t_{startSecond}$=−62167219200 is the first second of 1 AD, per the Gregorian calendar.

The variable $t_{offset}$ is set to the start time of the current billion-year node. Thus, every node traversed after the current billion-year node will be offset by this time of the current billion-year node. Moreover, N is set to this billion-year node to continue a further query. The current billion-year node (N) has ten 100 million-year nodes under it, the first being from $t_{startSecond}$=0 to $t_{endSecond}$=3155695199999999. The offset value $t_{offset}$ which is presently the start time of the current billion-year node is added to the start and end times of the current layer million-year nodes, yielding $t_{adjustedStartSecond}$=−62167219200 and $t_{adjustedEndSecond}$=3155633032780799. This time node contains $t_{second}$, since −62167219200<1553808563< 3155633032780799. The non-modified start time of the node containing the timestamp is added to $t_{offset}$, which is 0. Thus, $t_{offset}$=−62167219200. Set N to this node, and the query repeats at the next layer of nodes. During tree traversal, the start time of a non-root node is relative to the start time of its parent node. By adding $t_{offset}$ the absolute starting time value is obtained by adding the start time of the parent node.

The 100 million-year node (N) has ten 10 million-year child nodes, the first being from $t_{startSecond}$=0 to $t_{endSecond}$=315569519999999. This node will be selected as N, since the node contains the timestamp. Again, the non-modified start time is added to $t_{offset}$. Querying the tree continues in this manner until a layer of the tree is encountered with 10,000-year nodes. Thus, the following nodes are a portion of nodes found when N is a 10,000 year node with a $t_{startSecond}$=0 and $t_{endSecond}$=315569519999. It has ten millennium children, and the first three children have the following start/end times:

TABLE 2

| Child Node | Node Title | $t_{startSecond}$ | $t_{endSecond}$ | $t_{adjustedStartSecond}$ | $t_{adjustedEndSecond}$ |
|---|---|---|---|---|---|
| $N_0$ | "0" | 0 | 31556995199 | −62167219200 | −30610224001 |
| $N_1$ | "1" | 31556995200 | 63113903999 | −30610224000 | 946684799 |
| $N_2$ | "2" | 63113904000 | 94670899199 | 946684800 | 32503679999 |

Child node $N_2$, when adjusted by the offset $t_{offset}$, contains $t_{second}$, and thus $N_2$ is selected. The $t_{startSecond}$ is added to $t_{offset}$, yielding $t_{offset}$=946684800. Set N=$N_2$.

At this point in the query, N is currently a millennium node with ten century nodes as children. The first child with $t_{startSecond}$=0 and $t_{endSecond}$=3155759999, when adjusted by the offset $t_{offset}$, yields $t_{adjustedStartSecond}$=946684800 and $t_{adjustedEndSecond}$=4102444799, which does include $t_{second}$. Therefore, $t_{startSecond}$ is added to $t_{offset}$ and N is set to this child node ($N_0$). Note that $N_0$ is the first century of this millennium, and continue. The Table 3 below illustrates the current century node N with one-hundred-year nodes as children. A sample of the children of the current century node N is as follows:

TABLE 3

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{18}$ | "18" | 568080000 | 599615999 | 1514764800 | 1546300799 |
| $N_{19}$ | "19" | 599616000 | 631151999 | 1546300800 | 1577836799 |
| $N_{20}$ | "20" | 631152000 | 662774399 | 1577836800 | 1609459199 |

$N_{19}$, when adjusted, clearly contains $t_{second}$. Thus, the table yields the 19th year of the century, which is adjusted by $t_{offset}$ as done previously. Here, $t_{offset}$=1546300800 and set N=$N_{19}$, and continue.

N is now a year node with twelve-month nodes as children. The first four children are as follows:

TABLE 4

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{january}$ | "January" | 0 | 2678399 | 1546300800 | 1548979199 |
| $N_{february}$ | "February" | 2678400 | 5097599 | 1548979200 | 1551398399 |
| $N_{march}$ | "March" | 5097600 | 7775999 | 1551398400 | 1554076799 |
| $N_{april}$ | "April" | 7776000 | 10367999 | 1554076800 | 1556668799 |

The node $N_{march}$ contains $t_{second}$. Thus, the offset is adjusted as $t_{offset}$=1551398400, set N=$N_{march}$, and the query continues to the next level of nodes.

The node N is now a month node with thirty-one-day nodes as children. A sample of the children appear as follows:

TABLE 5

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{26}$ | "27" | 2246400 | 2332799 | 1553644800 | 1553731199 |
| $N_{27}$ | "28" | 2332800 | 2419199 | 1553731200 | 1553817599 |
| $N_{28}$ | "29" | 2419200 | 2505599 | 1553817600 | 1553903999 |

In Table 5, the offset of 1 is intentional, as Gregorian days are indexed using a value of 1, and an array of nodes is 0 indexed. The node $N_{27}$ contains $t_{second}$, and the offset is adjusted $t_{offset}$=1553731200. Set N=$N_{27}$, and the next layer is queried.

The node N is now a day node with twenty-four-hour nodes. A sample of the children appear as follows:

TABLE 6

| Child Node | Node Title | $t_{startSecond}$ | $t_{endSecond}$ | $t_{adjustedStartSecond}$ | $t_{adjustedEndSecond}$ |
|---|---|---|---|---|---|
| $N_{20}$ | "20" | 72000 | 75599 | 1553803200 | 1553806799 |
| $N_{21}$ | "21" | 75600 | 79199 | 1553806800 | 1553810399 |
| $N_{22}$ | "22" | 79200 | 82799 | 1553810400 | 1553813999 |

The node $N_{21}$ contains $t_{second}$, so the offset is adjusted $t_{offset}$=1553806800, set N=$N_{21}$. The query continues to the next layer.

The node N is now an hour node with twelve 5-minute nodes as children. A sample of the children appear as follows:

TABLE 7

| Child Node | Node Title | $t_{startSecond}$ | $t_{endSecond}$ | $t_{adjustedStartSecond}$ | $t_{adjustedEndSecond}$ |
|---|---|---|---|---|---|
| $N_4$ | "20" | 1200 | 1499 | 1553808000 | 1553808299 |
| $N_5$ | "25" | 1500 | 1799 | 1553808300 | 1553808599 |
| $N_6$ | "30" | 1800 | 2099 | 1553808600 | 1553808899 |

$N_5$ contains $t_{second}$, so the offset is adjusted to $t_{offset}$=1553808300, set N=$N_5$, and the query proceeds to the next layer.

N is now a 5-minute node with five one-minute children. The children appear as follows:

TABLE 8

| Child Node | Node Title | $t_{startSecond}$ | $t_{endSecond}$ | $t_{adjustedStartSecond}$ | $t_{adjustedEndSecond}$ |
|---|---|---|---|---|---|
| $N_0$ | "0" | 0 | 59 | 1553808300 | 1553808359 |
| $N_1$ | "1" | 60 | 119 | 1553808360 | 1553808419 |
| $N_2$ | "2" | 120 | 179 | 1553808420 | 1553808479 |
| $N_3$ | "3" | 180 | 239 | 1553808480 | 1553808539 |
| $N_4$ | "4" | 240 | 299 | 1553808540 | 1553808599 |

$N_4$ contains $t_{second}$, and thus the last node, the minute node, is obtained. The following nodes have been acquired in the traversal described above: "All time", "0 billion-year", "0-99 million-year", "0-9 million-year", "0-100,000", "0-10,000", "2", "0", "19", "March", "28", "21", "25", "4". By deriving the contributions of each node to the particular human-readable system, the date of 2019, March 28, 21:00 hours, 25+4 minutes, or 21:29, Mar. 28, 2019, is obtained.

Accordingly, the present techniques can use a tree structure as a compressed table to obtain an accurate date from a timestamp. This structure enables efficient modifications to a table which relies on all branches being the same.

Consider a hypothetical example where the table is modified to include a leap second $t_{leapSecond}$ that is added Dec. 31, 2019 as announced by the International Earth Rotation and Reference Systems Service. The addition of the $t_{leapSecond}$ can cause the replacement of a node. Because any modifications to a node's data affects every node pointing to that data, the modified node is first assigned a new ID. The ID and data are added to the corresponding table, and the ID replaces the parent node's previous, outdated, erroneous child. In this manner, the parent now points to the new node, not a modified node.

Figure 4A:
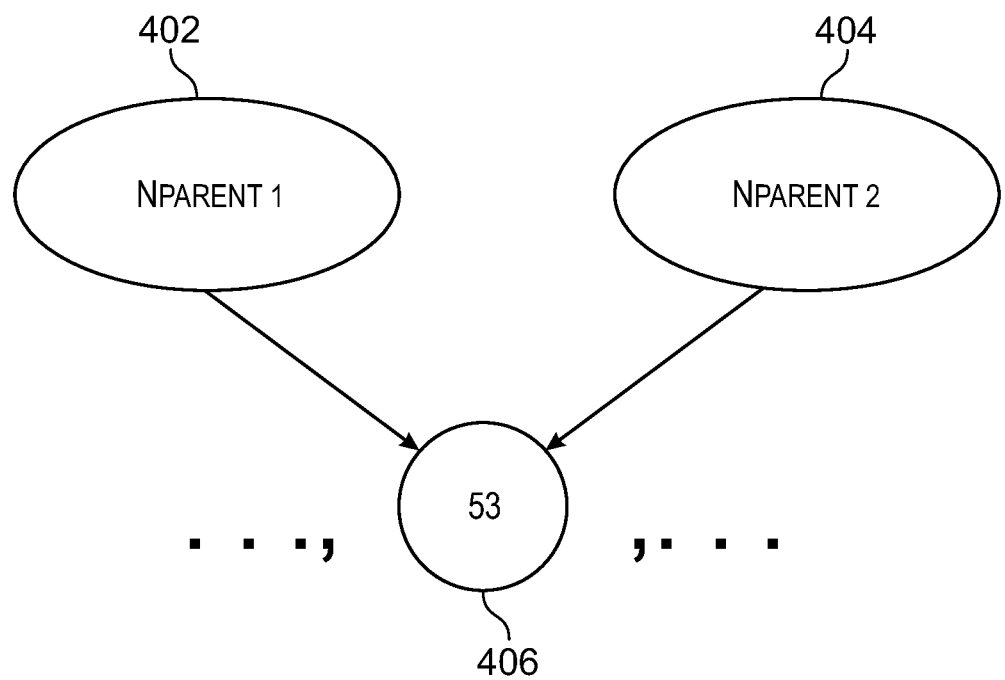
FIG. 4A is an illustration of replacing a node in a tree structure.

FIG. 4A is an illustration of replacing a node in a tree structure. The portion of the tree structure includes two nodes, $N_{parent0}$ 402 and $N_{parent1}$ 404, both of which contain the same set of children. For the purposes of this discussion, assume that these are the base layer, and neither node is modified directly, just their children. The node 406 with an ID of 53 may need to be changed to accommodate modifications to the time. A new node, $N_{new}$, is created and assigned the desired start and end time. In this example, the desired start and end time is likely related to node $N_{53}$'s start and end time in some way. For example, the addition of a leap second may cause the start and end time for $N_{53}$ to increase by one second. The new node, $N_{new}$, is assigned a new ID and is made the parent of the former children of $N_{53}$.

Figure 4B:
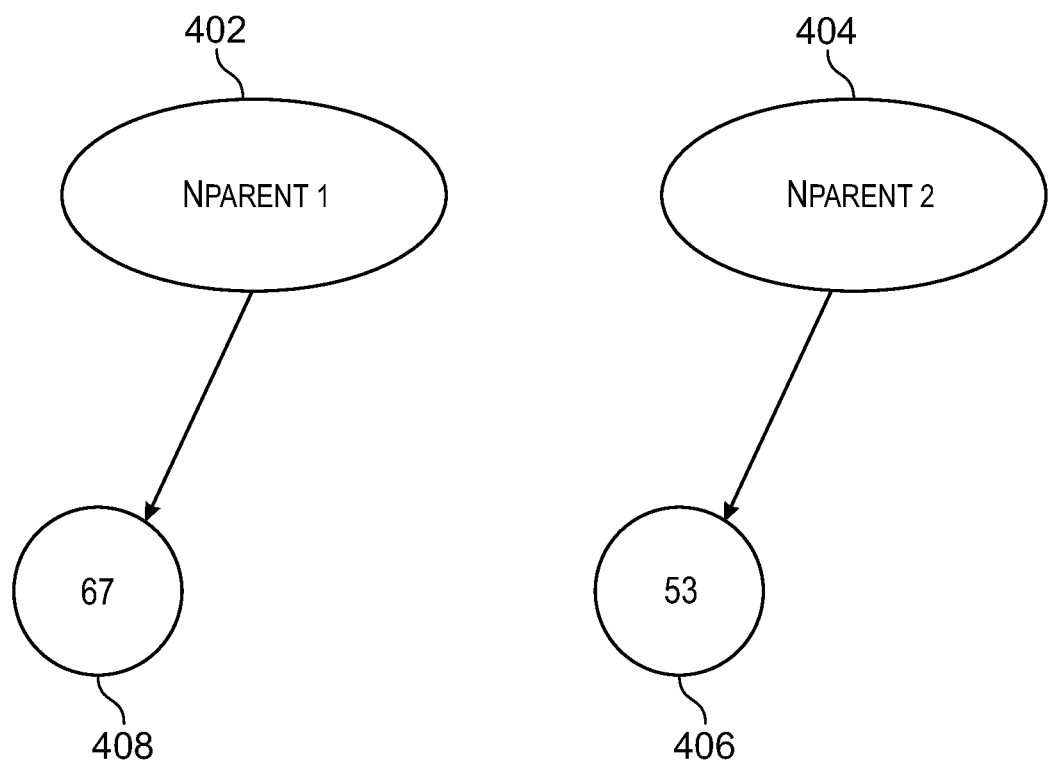
FIG. 4B is an illustration of a replacement node in a portion of a tree structure.

FIG. 4B is an illustration of a replacement node in a portion of a tree structure. Continuing with the example of FIG. 4A, the new node, $N_{new}$, is assigned a new ID of 67 and the set of children previously assigned to node $N_{53}$. Now node 408 $N_{67}$ is added to the table under the index 67. The parent node 402 $N_{parent1}$ is modified to point to this new node. Replacing a node may be referred to as a process called replace ($N_{parent}$, $N_{child}$, $N_{new}$), where $N_{parent}$ is a node to be replaced, $N_{child}$ is a child node of $N_{parent}$, and $N_{new}$ is the node to replace $N_{parent}$.

The time nodes in the tree structure described herein fall into three categories, each needing to be approached differently: (1) nodes before the second, (2) nodes containing the second, and (3) nodes after the second, where "the second" is a leap value. During a replacement process of nodes before the second, the nodes can remain the same and nothing is required. However, for nodes containing the second, additional processes may be required. First, note that for a single replacement process, only one branch of nodes will use these additional processes. Put another way, for any layer of nodes, a maximum of one node will actually contain this second to be added/subtracted.

In a replacement process, the first node encountered is the node of the base layer, which can be modified directly, given that there are no other nodes pointing to it. Call this node $N_{parent}$. After this, the children of $N_{parent}$ are queried. For all children before $t_{leapSecond}$, they are considered nodes before the second so those nodes can remain the same and nothing is required. Eventually, a node will be encountered that contains the timestamp, and is referred to as $N_{contains}$. A new node $N_{replacement}$ is created that copies $N_{contains}$ in every way except $t_{endSecond}$ and its corresponding ID. In the case of adding a leap second, the $t_{newEndSecond} = t_{endSecond} + 1$. Then the replacement process replace ($N_{parent}$, $N_{contains}$, $N_{replacement}$) as described with respect to FIGS. 4A and 4B is called.

Continuing the iteration of $N_{parent}$'s children, all of the children after replacement will be nodes after the second. After the iteration of $N_{parent}$'s children is complete, $N_{parent}$ is set to $N_{replacement}$. The replacement process is repeated on the children of $N_{replacement}$. The stop condition is when $N_{parent}$ has no child that contains a leap second. After the replacement process has been fully applied to a particular branch where $N_{contains}$ was found, iterating is finished through the base layer. After the replacement node is added, all remaining nodes are considered nodes after the second. To update nodes after the second, instead of adding 1 to only $t_{endSecond1}$, 1 is added to $t_{startSecond}$ as well. Unlike the node that contains the second, this addition occurs at the parent node, given that the $t_{startSecond}$ for the parent node is increased by 1 and every child is relative this parent node. No further additions are necessary.

In addition to adding and subtracting seconds from time as needed, the present techniques enable the addition of new labels. For example, consider a scenario where a new month of "Smarch" is added to the typical Gregorian calendar. To implement an addition process, again, the time nodes in the tree structure described herein fall into three categories, each needing to be approached differently: (1) Nodes before the new month, (2) Nodes containing the new month, and (3) Nodes after the new month. During an addition process, for nodes that occur before the new month, the nodes can remain the same and nothing is required. However, for nodes containing the new month, additional processes may be required.

There are a few subcases to consider when adding a month label: (1) the current layer is above a month layer (e.g. a year, century, etc.); (2) the current layer is the month layer; or (3) the current layer is below a month layer (day, hour, etc.). When the current layer is above a month, $t_{endSecond}$ is modified by adding to it the number of seconds that is the length of the month to be added. The sibling months are then modified by adding the length of $N_{smarch}$ in seconds to $t_{startSecond}$ and $t_{endSecond}$. When current layer is the month layer, an entirely new node $N_{smarch}$ is inserted in the layer. The sibling months are then modified by adding the length of $N_{smarch}$ in seconds to $t_{startSecond}$ and $t_{endSecond}$. When the current layer is below a month, nothing needs to be done. Here, an assumption is made that $N_{smarch}$ has been constructed in such a way that it contains the proper number of child nodes, presumably all being day nodes.

For ease of description, the present techniques have been described such that a single descriptive label corresponds to the time interval of each node. For example, the month of March may correspond to a particular time interval, with no other months corresponding to the time interval represented by March. However, there are some calendar systems for which a child label will sometimes have two parents. One such example would be in the Japanese Era Calendar during the transition from the Showa era to the Heisei era in January of 1989. In this example, days 1-7 of January belong to Showa Era, whereas 8-31 belong to Heisei Era. In other words, there is month label that belongs to two different year labels.

Another example is that of a school year calendar that is split into a series of semesters and breaks from school that span the year. In this example, a school year calendar may begin in August of a Gregorian calendar system and end the following May in a Gregorian calendar system. The school year may have one or more semesters. A semester not only can have multiple years (for example, a winter break that crosses the new year mark), but also a semester may end in a disjoint manner with a child month (for example, a spring semester that ends in the middle of April). As used in this example, a semester may be a label that occurs with nodes that are between year and month labels in the exemplary Gregorian calendar system. However, in some cases, the label that corresponds to multiple parent labels may be smaller than a month.

In the present example, consider a school calendar's Winter Break of 2018 that begins on Dec. 15, 2018 and ends at the end of the day on Jan. 13, 2019 (one second before the first second of Jan. 14, 2019). The school calendar system is represented as data according to the techniques described herein. Similar to adding a leap second or a leap month as described above, an additional custom branch is added to the tree structure. Replica nodes with new node IDs are created for the parent nodes of 2018 and 2019, $N_{2018}$ and $N_{2019}$. The start/end times of the parent nodes $N_{2018}$ and $N_{2019}$ are not modified. However, if a child node is changed in any manner, unless it is changed in a custom branch of the tree structure all the child nodes of all branches are modified.

In this example, a node $N_{winterBreak2018PreNewYears}$ and a node $N_{winterBreak2018PostNewYears}$ are constructed to correspond to the label "Winter Break of 2018." Each node $N_{winterBreak2018PreNewYears}$ and $N_{winterBreak2018PostNewYears}$ has start and end times relative to their parent nodes, which will be $N_{2018}$ and $N_{2019}$ respectively. The node $N_{winterBreak2018PreNewYears}$ is assigned a $t_{startTime}$=30067200 and $t_{endTime}$=32659199. Note that $t_{endTime}$ is after 2018 and therefore outside the scope of $N_{2018}$, this is intentional. The node $N_{winterBreak2018PostNewYears}$ is assigned a $t_{startTime}$= −1468800 and $t_{endTime}$=1123199. Similarly the $t_{startTime}$ of $N_{winterBreak2018PostNewYears}$ is outside the scope of $N_{2019}$. Each of the node $N_{winterBreak2018PreNewYears}$ and $N_{winterBreak2018PostNewYears}$ are assigned a label identification (ID). In particular, the node $N_{winterBreak2018PreNewYears}$ and $N_{winterBreak2018PostNewYears}$ are assigned the same label ID. The label ID may correspond to a human-readable label. How the label ID is represented is irrelevant as long as uniqueness is ensured, where a label ID is never equal to another label ID unless it is intended.

To modify the child nodes, note that in this particular example, the semester is smaller than the month children it will hold. However, this won't always be the case. There are two basic cases that are of interest. The first case is when a semester encapsulates a month child. In this case, the month child node is assigned to be one of the semester label's children, with start/end times relative to the semester's start time. The second case is where a semester shares a month child with one or more semesters. In this second case, a month could be shared with many semesters. For example, a quarterly system may result in a month having the end of one semester, a break, and then the beginning of another semester.

In the second case each month child node has start times before the parent node's start times and end times greater than the parent node's end times. The label ID of each duplicate child node generated is the same, while the node ID is unique. Note that this case includes a semester that is completely encapsulated by a month or a semester that is split by months.

Continuing with the Winter Break 2018 example, the month of December ($N_{december}$) is shared between two semesters, $N_{fallSemester2018}$ and $N_{winterBreak2018PreNewYears}$, with the month of January ($N_{january}$) being shared between two semesters, $N_{winterBreak2018PostNewYears}$ and $N_{springSemester2019}$. If a query is issued for a section of time between Jan. 1, 2019 and Jan. 13, 2019, one copy of $N_{january}$ is returned. The same applies to a query issued for a section of time after Jan. 13, 2019 (assuming the query is within the interval of $N_{january}$). However, if a query is issued for a timeslot such as Jan. 10-15, 2019, two copies of the $N_{january}$ node may be returned. These two copies are $N_{january}$ and $N'_{january}$, with one belonging to $N_{winterBreak2018PostNewYears}$ and one belonging to $N_{springSemester2019}$. This is because both nodes exist in memory, being substantially identical except for the node ID. Substantially identical refers to the start and end times of the nodes appearing identical once they've been recalculated to consider their parent node's start times. Because the nodes $N_{winterBreak2018PreNewYears}$ and $N_{winterBreak2018PostNewYears}$ are assigned the same label ID, the nodes can be filtered to remove duplicates. The nodes are filtered by checking to determine if a node has been added with the same label ID the results set. Regardless of which duplicate child node is obtained, it will have the proper time, given that its start and end times are not confined to its parent node's start and end times but are still relative to them.

The same logic applies to querying across the 2018 and 2019 border. Here, both $N_{winterBreak2018PreNewYears}$ and $N_{winterBreak2018PostNewYears}$ are received, but given that they have the same label ID, one is filtered out, thus rendering no duplicates. While conceptually a child node will have two parents, functionally, the data structure maintains a one-to-many relationship with the child nodes.

Furthermore, according to embodiments described herein, such tree structures are constructed for any number of different calendar systems. Examples of particular calendar systems for which tree structures may be constructed include, but are not limited to, lunar calendar systems, solar calendar systems, religious calendar systems, and/or specific national calendar systems. Examples of other, more specific calendar systems for which tree structures may be constructed include, but are not limited to, the Gregorian calendar system, the Julian calendar system, the Islamic calendar system, the Hindu calendar system, the Buddhist calendar system, the Hebrew calendar system, and/or the Baha'i calendar system. In addition, tree structures may be constructed for non-traditional and/or custom calendar systems. For example, a tree structure may be constructed for a calendar system corresponding to a fiscal year for a particular company or organization. As another example, a tree structure may be constructed for a school and/or college calendar system, in which case the calendar year may be broken into customized semesters or quarters based on the academic calendar of the particular school or college. Moreover, individual time zones may be regarded as specific calendar systems, and tree structures may be constructed for such time zone calendar systems. For example, for users located within North America, tree structures may be constructed for the Pacific Time Zone calendar system, the Mountain Time Zone calendar system, the Central Time Zone calendar system, and/or the Eastern Time Zone calendar system. Furthermore, tree structures may be constructed for calendar systems with values that frequently change, such as, for example, the daylight savings calendar system and/or the Japanese calendar system. As will be appreciated by those skilled in the art, any number of calendar systems may also be combined into a single calendar system depending on the details of each particular implementation.

Figure 5:
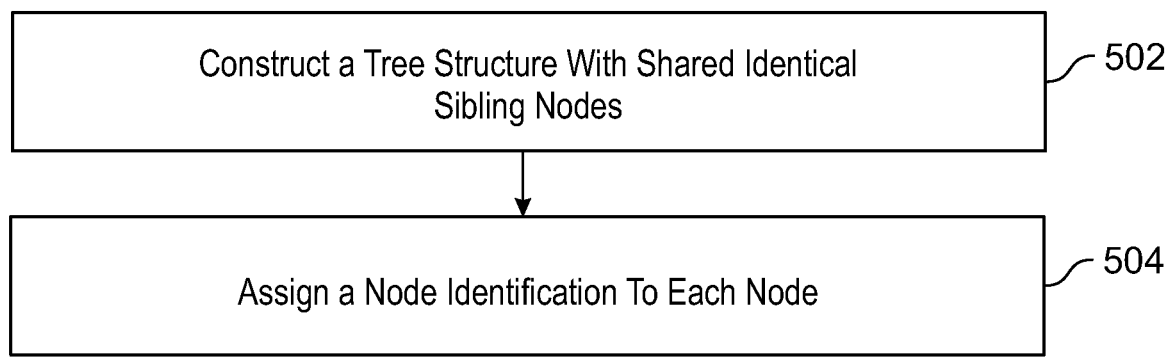
FIG. 5 is a process flow diagram of a method for enabling the representation of time as data.

Exemplary Method for Enabling Representation of Time as Data for Particular Calendar Systems FIG. 5 is a process flow diagram of a method 500 for enabling time as data. According to embodiments described herein, the method 500 is executed by a computing system, such as the computing system 800 described with respect to FIG. 8. The method 500 begins at block 502, at which a tree structure is constructed, wherein layers of the tree comprise identical sibling nodes for layer above a threshold interval size and parent nodes share identical sibling nodes. As used herein, the threshold interval size may be a number of years below which there exists no identical intervals. With regard to the Gregorian calendar, the threshold interval size is an interval of 10,000 years. Intervals, such as millennium (1000) years, are not identical with regard to time due to the leap year mechanism integrated into the Gregorian calendar. In a different calendar system, the threshold interval size may vary.

Moreover, intervals of nodes above the threshold interval size are identical. In particular, the time intervals contained in the intervals of nodes above the threshold interval size contain exactly the same amount of time. At block 504, a node identification is assigned to each node of the tree structure, wherein each node of the tree structure corresponds to a particular time interval. In embodiments, the node ID may be any value. In some cases, the node ID is an encoded form of the node. The node ID may also be deterministic.

To convert a system time value to human-readable time, the tree structure is traversed according to a tree traversal algorithm. In particular, the tree may be traversed by visiting each node that contains the time stamp. In this manner, a data structure in the form of a compressed tree with a lookup table enables a flexible source of information for acquiring a "label" of a timestamp. With such a flexible system, the Japanese government can easily modify their year labels, schools can insert their breaks as part of the calendar itself, scientific bodies can add leap seconds, and other cases involving the need to modify a calendar past its rigorous mathematical setup become possible.

In various embodiments, the process described above results in the generation of a tree structure that effectively maps a particular calendar system to the universal time using time intervals that are specific to the calendar system. Moreover, according to embodiments described herein, this process is repeated to construct tree structures for a number of different calendar systems. In this manner, a calendar application that is independent of any particular calendar system can be used to represent particular fragments of time relative to any number of different calendar systems based on the mapping of the corresponding tree structures to the universal time. In other words, the calendar content items scheduled using the calendar application may be independent of any particular calendar system, thus allowing the calendar content items to be represented using human-readable time fragments relative to any number of different calendar systems, as described further herein.

Translation of Time Between Multiple Calendar Systems Using Representation of Time as Data As described herein, there are many different calendar systems that people throughout the world use every day. While these calendar systems have relationships to each other (with some having more direct relationships than others), each calendar system labels regions of universal time differently. For example, a single fragment of universal time may be labeled as "January," "Winter Quarter," or "Tevet-Shevat," for example, depending on the calendar system being used.

Moreover, each calendar system essentially consists of a particular labeling scheme for a time period relative to how the Earth works. In other words, each calendar system provides a specific mechanism for labeling periods where the sun and/or moon is in a particular position relative to the Earth. As such, it is possible to convert a point in time between multiple calendar systems.

Furthermore, when a user of a computing system schedules events within a calendar application, which is typically set up relative to a particular calendar system, the user is often scheduling events relative to the universal time rather than relative to the particular calendar system. For example, if a user records his birthday on his calendar as being on December $24^{th}$ in the Pacific Standard Time calendar system, the user's birthday really corresponds to the universal time that it takes for the Earth to make one complete revolution around the sun relative to the moment of his birth. Therefore, the user's birthday is technically independent of the specific calendar system used. Accordingly, if the user viewed his birthday event on his calendar with respect to the Eastern Standard Time calendar system, the user would expect to see his birthday fully exists on the day corresponding to December $24^{th}$, not at 3 AM December $24^{th}$ through 3 AM December $25^{th}$, as would be the result if the calendar application scheduled the event against the particular calendar system rather than the universal time. Similarly, if the user viewed his birthday event on his calendar with respect to a particular college calendar system, the user would expect to see his birthday automatically exists during "Fall Quarter," for example. (However, it is worth noting that, in some cases, events are actually scheduled relative to the particular calendar system. For example, a meeting scheduled for 1 PM in the Pacific Standard Time calendar system should correctly show up as being scheduled at 4 PM when viewed in the Eastern Standard Time calendar system.)

Unfortunately, even though users often schedule events (and/or other calendar content items) relative to the universal time rather than relative to the particular calendar system used, current calendar applications do not provide an easy way to translate events (and/or other calendar content items) between different calendar systems based on the universal time or to view events (and/or other calendar content items) relative to multiple different calendar systems simultaneously. Therefore, according to embodiments described herein, calendar systems are effectively decoupled from the events (and/or other calendar content items) scheduled on a calendar application, and the calendar application is rearchitected on top of a calendar-system-agnostic universal time. This, in turn, enables easier translation between different calendar systems, as desired by the user.

In practice, this is accomplished by constructing tree structures for a number of different calendar systems, as described above, where each tree structure is decoupled from the calendar content items (e.g., events) scheduled on a calendar application and is instead mapped to the universal (or absolute) time. Moreover, this flexibility allows for both point-in-time scheduling to a universal time (such as, for example, scheduling an event that occurs at the universal time corresponding to 5 PM on Dec. 24, 2021 within the Pacific Standard Time calendar system, regardless of the current calendar system being used), as well as explicit references to any time fragment of a calendar system (such as, for example, the universal time corresponding to Jan. 20, 2021 as a fully-described time fragment of the Pacific Standard Time calendar system or, as an example of a smaller time fragment, the universal time corresponding to Jan. 20, 2021, 5:51 PM as a fully-described time fragment of the Pacific Standard Time calendar system).

Mapping individual calendar systems to the universal time in this manner enables various user scenarios. In a first exemplary user scenario, events relative to a certain time fragment of a calendar system (e.g., a particular month and day) can be easily represented across calendar systems. For example, a user may schedule an anniversary as an event on January 28$^{th}$, repeating yearly, and the event will always show up on the time fragment corresponding to January 28$^{th}$ regardless of which calendar system is used.

In a second exemplary user scenario, events specific to a particular point in universal time can be easily viewed in any desired calendar system. For example, a meeting or other event scheduled for January 28$^{th}$ at 5 PM in the Pacific Standard Time calendar system may show up as being scheduled for January 28$^{th}$ at 8 PM when viewed relative to the Eastern Standard Time calendar system. This is due to the fact that both calendar systems have specific labels for that specific point in universal time. Furthermore, in some embodiments, the meeting or event may also be viewed relative to more than one calendar system at the same time.

In a third exemplary user scenario, since calendar systems are decoupled from the scheduling time, a calendar application may show a particular time fragment (or time span) in multiple calendar systems simultaneously. For example, if a user is traveling to Japan on January 28th, the calendar application may display the days before January 28$^{th}$ in the Pacific Standard Time calendar system and the days starting with January 28$^{th}$ in the Japanese Standard Time calendar system. This enables the user to plan events during the trip using the most relevant calendar system. For example, when the user makes a dinner reservation at 8 PM while in Japan, the user can simply add the reservation to his calendar as occurring at 8 PM, rather than having to calculate the time based on the time zone.

Furthermore, in a fourth exemplary user scenario, because the calendar systems are mapped to the universal time with a notion of time fragments, the user can schedule events relative to particular time fragments within a particular calendar system and still view such events in other calendar systems. For example, if a particular college schedules a "Finals Week" event for the "last week of Winter Quarter" within the college's custom calendar system, the calendar application may find the corresponding universal time mapping for the time fragment. Then, if a user chooses to switch the visible calendar system from the college's custom calendar system to the Pacific Standard Time calendar system, the "Finals Week" event will still appear in the correct place within the user's calendar. This is due to the fact that both decoupled calendar systems map to the same universal time. Moreover, if the college were to update its calendar system by, for example, extending the Winter Quarter by a week due to snow days, any events scheduled relative to the time fragment reference of "last week of Winter Quarter" may be automatically updated to accommodate the change. Furthermore, in some embodiments, the user may choose to view the "Finals Week" event in the college's custom calendar system and the Pacific Standard Time calendar system simultaneously and, in such embodiments, the "Finals Week" event will appear in the correct place within both calendar systems.

Figure 6:
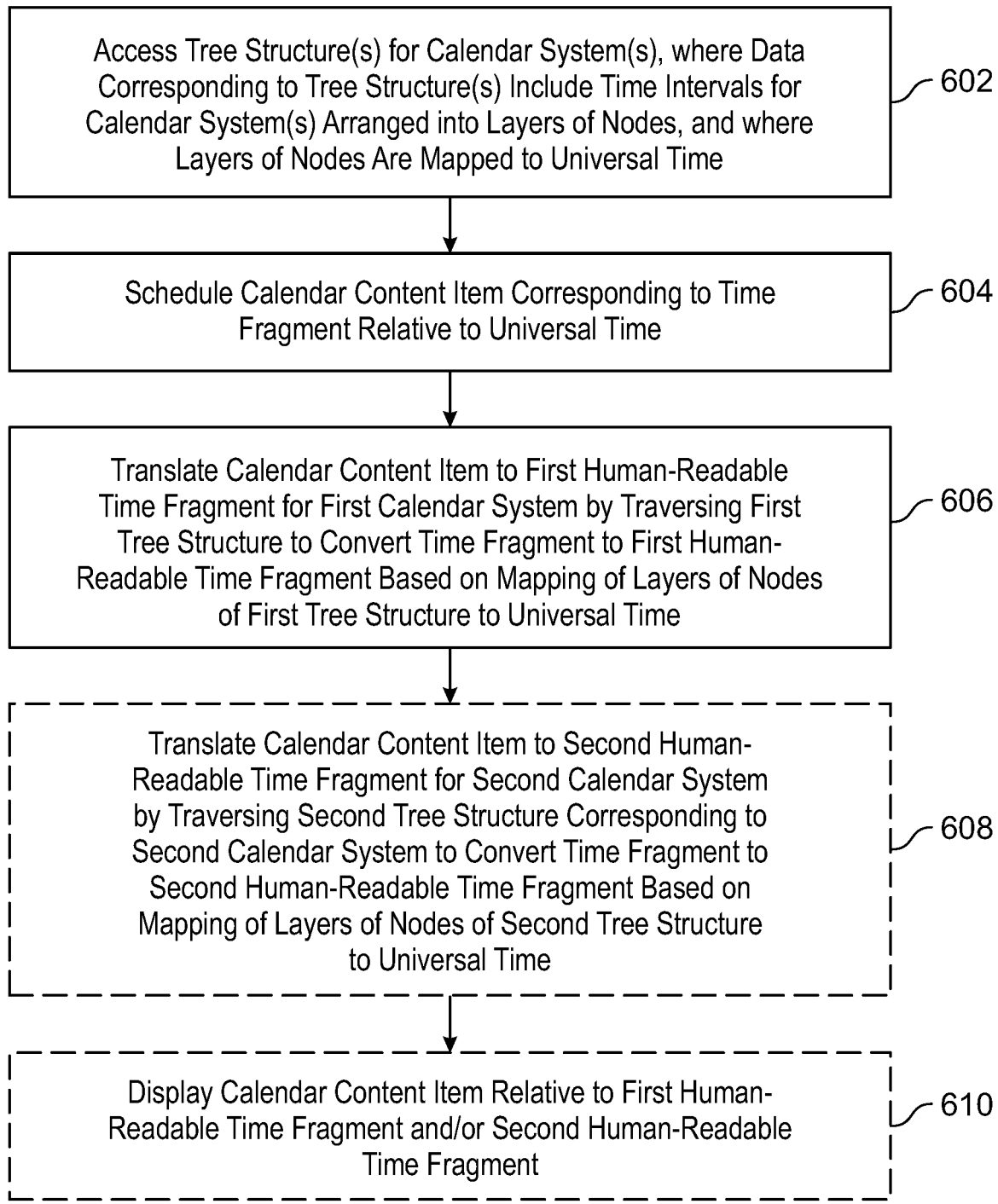
FIG. 6 is a process flow diagram of a method for translating time between multiple calendar systems.

FIG. 6 is a process flow diagram of a method 600 for translating time between multiple calendar systems. According to embodiments described herein, the method 600 is executed by a computing system, such as the computing system 800 described with respect to FIG. 8. The method 600 begins at block 602, at which one or more tree structure(s) for one or more calendar system(s) are accessed (or received), where data corresponding to the tree structure(s) include time intervals for the corresponding calendar system(s) that are arranged into layers of nodes, and where the layers of nodes are mapped to universal time. In some embodiments, accessing the tree structure(s) includes first constructing the tree structure(s) such that the layers of each tree structure below a root node include identical sibling nodes for layers above a threshold interval size that is a smallest repeatable unit of time according to the corresponding calendar system, as well as assigning node identifications to the nodes of each tree structure such that the time interval for each node in the layers of the tree structure above the threshold interval size for the corresponding calendar system is a repeatable unit of time and the time interval for each node in the layers of the tree structure below the threshold interval size for the corresponding calendar system varies according to leap values.

At block 604, a calendar content item corresponding to a time fragment relative to the universal time is scheduled. The calendar content item may include, but is not limited to, an event, media content (e.g., one or more photographs, audio, video, and/or animations), a social networking blurb (such as a social status update or a tweet), a link (e.g., a link to another application), web-browsing history, a reminder, and/or a document.

At block 606, the calendar content item is translated to a first human-readable time fragment for a first calendar system by traversing a first tree structure to convert the time fragment to the first human-readable time fragment based on the mapping of the layers of nodes of the first tree structure to the universal time. At optional block 608, the calendar content item is translated to a second human-readable time fragment for a second calendar system by traversing a second tree structure to convert the time fragment to the second human-readable time fragment based on the mapping of the layers of nodes of the second tree structure to the universal time. Moreover, at optional block 610, a representation of the calendar content item is displayed relative to the first human-readable time fragment and/or the second human-readable time fragment. In some embodiments, this includes displaying the representation of the calendar content item based on a map calendar, where the map calendar includes a continuous, manipulable sequence of data organized as units of time within a coordinate plane.

Furthermore, in various embodiments, the method 600 also includes scheduling a second calendar content item corresponding to a second time fragment relative to the second calendar system, as well as translating the second calendar content item to a second human-readable time fragment for the first calendar system by: (1) traversing the second tree structure corresponding to the second calendar system to convert the second time fragment to a corresponding universal time based on the mapping of the layers of nodes of the second tree structure to the universal time; and (2) traversing the first tree structure corresponding to the first calendar system to convert the universal time corresponding to the second time fragment to the second human-readable time fragment based on the mapping of the layers of nodes of the first tree structure to the universal time. As an example, such embodiments may correlate to the first and/or fourth exemplary user scenarios described herein.

In some embodiments, the method also includes scheduling the calendar content item corresponding to the time fragment relative to the universal time and a second calendar content item corresponding to a second time fragment relative to the universal time. In such embodiments, the method may also include translating the calendar content item to the first human-readable time fragment for the first calendar system by traversing the first tree structure corresponding to the first calendar system to convert the time fragment to the first human-readable time fragment based on the mapping of the layers of nodes of the first tree structure to the universal time. Moreover, in such embodiments, the method may further include translating the second calendar content item to a second human-readable time fragment for a second calendar system by traversing the second tree structure corresponding to the second calendar system to convert the time fragment to the second human-readable time fragment based on the mapping of the layers of nodes of the second tree structure to the universal time. Furthermore, in such embodiments, the method may include simultaneously displaying a first representation of the calendar content item relative to the first human-readable time fragment and a second representation of the second calendar content item relative to the second human-readable time fragment. As an example, such embodiments may correlate to the second exemplary user scenario described herein.

Furthermore, in some embodiments, the method also includes displaying a representation of the calendar content item relative to the first human-readable time fragment and displaying a representation of time fragments that occur before and/or after the calendar content item, as measured based on the universal time, relative to at least one other calendar system. As an example, such embodiments may correlate to the third exemplary user scenario described herein.

Exemplary Translation of Time Between Multiple Calendar Systems within Digital Map Calendar Application In various embodiments, the present techniques are implemented within a digital map calendar application including a digital map calendar user interface, where the digital map calendar user interface provides an electronic representation of time as a map calendar including a continuous, manipulable sequence of data organized as units of time within a coordinate plane. In some embodiments, the coordinate plane includes a first axis (e.g., an X-axis) that represents time and a second axis (e.g., a Y-axis) that represents partitions of calendar content items according to a calendar content type.

In various embodiments, the manipulation of the map calendar enables real-time shifting and/or conversion of the units of time used to render calendar content items, where such calendar content items may include, but are not limited to, events, media content (e.g., photographs, audio, video, and/or animations), social networking blurbs (such as social status updates and tweets), links (e.g., links to other applications), web-browsing history, reminders, and/or documents. In addition, in various embodiments, the map calendar is able to be panned, meaning that the user can scroll across the map calendar as though moving across a panorama. Moreover, in various embodiments, the map calendar is zoomable, meaning that a user can zoom in or zoom out to view time organized into different units.

In various embodiments, the digital map calendar application is compatible with any number of different calendar systems. Moreover, the techniques described herein for representing the time corresponding to each calendar system as a tree structure that is mapped to the universal time enables the digital map calendar user interface to translate one or more calendar content items between calendar systems in a fluid manner such that the user can view the same calendar content item(s) relative to any number of different calendar systems, either individually or simultaneously. In some embodiments, the translation of the calendar content items may include simply choosing a desired calendar system from a drop-down menu, for example, at which point the digital map calendar user interface may display all relevant calendar content items relative to the desired calendar system. For example, a user may view his calendar content items relative to the Gregorian calendar system by simply selecting the Gregorian calendar system within the drop-down menu. At some future point in time, the user may then view the same calendar content items relative to the Japanese calendar system, for example, by simply selecting the Japanese calendar system within the drop-down menu. Additionally or alternatively, in some embodiments, the user may choose to view his calendar content items relative to more than one calendar system simultaneously. For example, the user may choose to view his calendar content items relative to both the Gregorian calendar system and the Japanese calendar system simultaneously, such as, for example, in a side-by-side or overlapping manner. Additionally or alternatively, in some embodiments, calendar content items corresponding to different time fragments may be displayed relative to different calendar systems. For example, as described herein, a user may view time fragments before and after a planned vacation relative to the calendar system for his current time zone, but the user may view the time fragment corresponding to the planned vacation relative to the calendar system for the time zone of his vacation location, as described with respect to FIG. 7. Furthermore, those skilled in the art will appreciate that any number of additional user scenarios can be envisioned for translating time fragments between calendar systems using the digital map calendar application.

Figure 7:
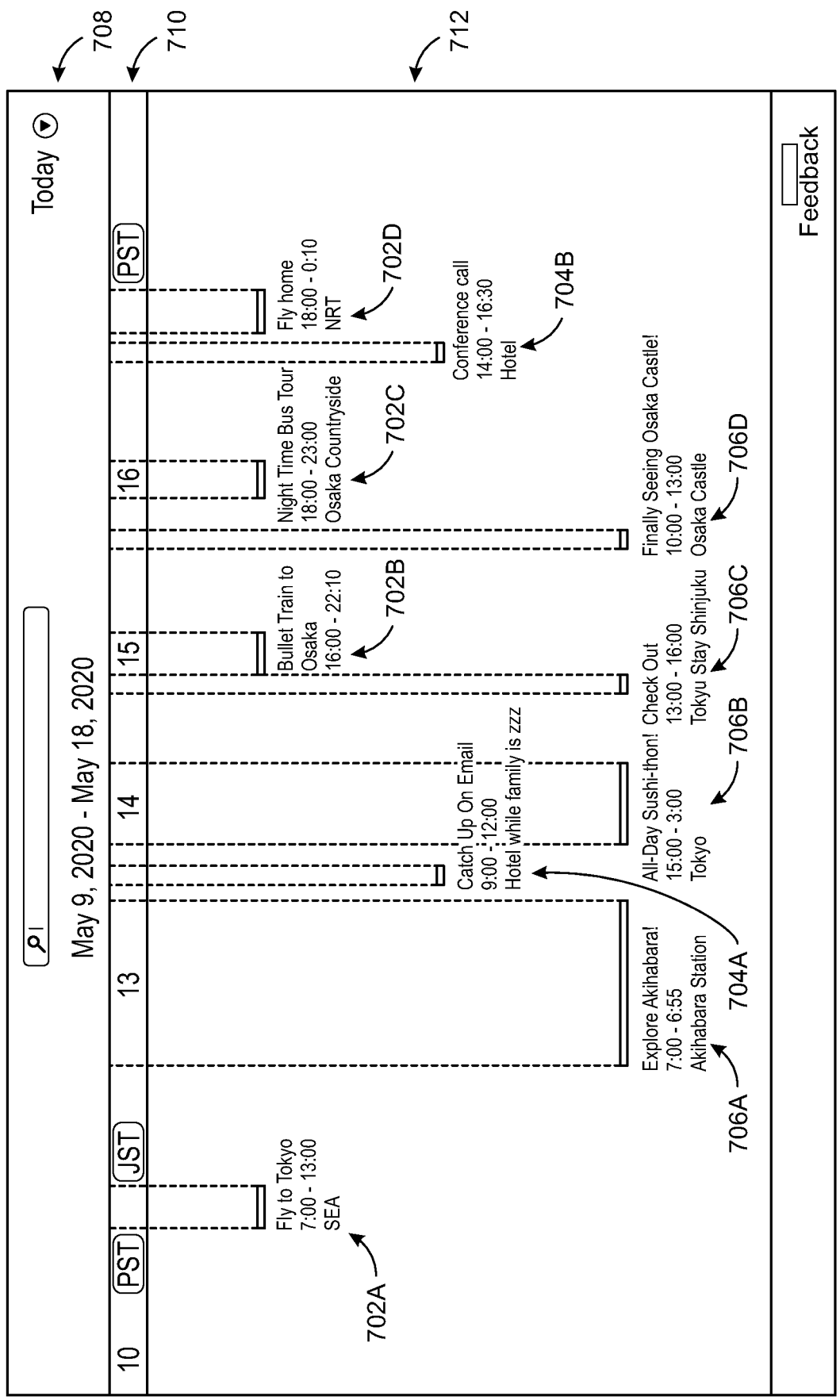
FIG. 7 is a schematic view of an exemplary map calendar with a day-based time representation that may be used according to embodiments described herein.

FIG. 7 is a schematic view of an exemplary map calendar 700 with a day-based time representation that may be used according to embodiments described herein. In various embodiments the map calendar 700 is rendered via a display of an electronic device, such as the computing system 800 of FIG. 8. Moreover, the view of the map calendar 700 rendered at the display is capable of being manipulated via input from a user. Manipulation of the map calendar may be defined as a continuous movement of a calendar view. The manipulation can result in the addition of calendar content to the calendar view, or the manipulation can result in the subtraction of calendar content from the calendar view. Moreover, the manipulation of the calendar content may result in any combination of addition or subtraction of the calendar content. As used herein, the term "continuous" refers to a smooth, unbroken transition from a first calendar view to a second calendar view. Rendered calendar content is updated in response to a manipulation in a seamless, visually unbroken manner.

For example, a user may pan or scroll along an axis of time presented by the map calendar. In this manipulation, content is added to and subtracted from the calendar view as the view changes to render future or past calendar content at differing times according to the same time unit. A user may also zoom in or zoom out of a time representation presented in a view by the map calendar 700. In various embodiments, a zoom-in function results in increasingly smaller units of time rendered by the map calendar 700. Conversely, a zoom-out function results in increasingly larger units of time rendered by the map calendar 700. In a zoom type manipulation, content is added to or subtracted from the calendar view as the view changes to render future or past calendar content at substantially the same points in time, using differing time units. In this manner, the map calendar 700 is a dynamic organization of time that can be manipulated by a user. The organization of time enabled by the map calendar 700 is not limited by the particular format of the calendar system. In particular, the time units may be according to any calendar system or combination of calendar systems. The present techniques also enable a toggle between different calendar systems or combinations of calendar systems. For example, according to the embodiment shown in FIG. 7, the calendar view is partially rendered according to the Pacific Standard Time (PST) calendar system and partially rendered according to the Japanese Standard Time (JST) calendar system.

Generally, the map calendar 700 according to the present techniques organizes calendar content using a coordinate plane. The coordinate plane may be considered a grid that is used to convey time information associated with content to be rendered by the map calendar 700. Thus, the map calendar 700 can include a horizontal axis and a vertical axis. The horizontal axis and the vertical axis are perpendicular to each other. The horizontal axis may be generally referred to as the X-axis, and the vertical axis may be generally referred to as the Y-axis. In some embodiments, the X-axis of the map calendar 700 represents time. In the example of FIG. 7, a time value may increase when moving from left to right along the x-axis of the map calendar 700. For ease of description, the present techniques describe time as being a unit of measure along the X-axis. However, time can be organized along either the X-axis or the Y-axis, and the map calendar 700 according to the present techniques should not be viewed as limited by a particular axis of the coordinate plane. Moreover, the remaining axis (i.e., the axis other than the axis used to represent time) is not limited to the representation of a particular value. The remaining axis can be modified according to rules and user preferences. In some embodiments, the remaining axis (i.e., the Y-axis in the example of FIG. 7) is used to partition the calendar content items according to calendar content types. For example, in the example of FIG. 7, the calendar content items are partitioned into travel-type content items 702A, 702B, 702C, and 702, work-type calendar content items 704A and 704B, and vacation-related calendar content items 706A, 706B, 706C, and 706D. As shown in FIG. 7, the differing content item types may be rendered at different positions along Y-axis according to type. As used herein, a content item type refers to a category associated with the content item. The content item type includes, but is not limited to, locations, people, sources, and levels of time.

The map calendar 700 includes a label section 708, a header section 710, and an event section 712. For ease of description, the label section 708, the header section 710, and the event section 712 are positioned in certain layout. In particular, the label section is illustrated at the top of the rendered map calendar 700, with the header section 710 immediately below the label section 708. Further, the event section 712 is illustrated as immediately below the header section 710. However, the present techniques are not limited to the particular layout illustrated in FIG. 7. Rather, the label section 708, the header section 710, and the event section 712 can be positioned at any location in the rendered map calendar 700. Moreover, some sections may be hidden or otherwise removed from the map calendar.

In the illustration of FIG. 7, the label section 708 provides labels or names associated with the particular unit of time presently rendered by the map calendar 700. For example, the label section 708 of FIG. 7 is illustrated as including May 9, 2020 through May 18, 2020. Accordingly, the map calendar 700 includes events that occur on days from May 9, 2020 through May 18, 2020. The label section 708 will update in response to the user manipulating the calendar view within the event section 712. For example, if content for a single day is rendered by the map calendar 700 in the events section 712, the label section 708 will provide a particular label or name corresponding to the currently-rendered day. Similarly, if a single year is rendered, the label section 708 will be updated to reflect the particular year being rendered. Accordingly, the label section 708 enables a dynamic labeling function that corresponds to the unit of time rendered in the calendar view. Additionally, the label rendered by the label section 708 may be approximate, where the label to be rendered is selected based on a closest or nearest unit of time rendered in the calendar view.

The header section 710 renders the particular units of time along the X-axis. In particular, the header section 710 is illustrated as including header blocks with units of time designated in the header. In the example of FIG. 7, the label section 708 denotes individual days from May 9, 2020 through May 18, 2020 as being illustrated. The header section 710 further segments the period of days indicated by the label section 708. Specifically, the numbers in the header section 710 correspond to enumerated days of the month of May indicated by the label section 708.

The events section 712 includes calendar content items such as events associated with particular times that occur during May 9, 2020 through May 18, 2020. As used herein, an event is a circumstance associated with a general time frame. An event is calendar content item, where other examples of calendar content items include, but are not limited to, media content such as photographs, audio, video, animations, social networking blurbs (such as social status updates and tweets), links such as links to other applications, web-browsing history, reminders, documents, and the like. Calendar content items may also include applications that are embedded in the calendar surface. Applications embedded in the calendar surface execute within execution context of the map calendar. Executing an application within the execution context of the map calendar does not require the opening and execution of the application outside of the map calendar. For example, a drawing application may be considered a calendar content item. The drawing application enables a user to share drawings with other users of the same map calendar. The drawing functionality may be executed within the map calendar, without opening a separate instance of the drawing application. Further, calendar content items can also include "To-Do" items or "Task" items. To-Do and Task items are generally calendar content items that indicate to a user a specific action that should be taken by the user prior to a specific deadline. By contrast, an event is a circumstance which may or may not include a specific action associated with a general time frame. The To-Do and Task items can be rendered in a list format, where a user can revise the To-Do and Task items to reflect progress made by the user on completing the items.

Generally, some events may have well defined start and stop times, whereas other events are associated with a general time. In embodiments, calendar content items can have relationships with other calendar content items. The event relationships, the pan level, and the zoom level are factors in how events are rendered in the events section 712. In particular, the relationships, pan level, and zoom level can be used to enable semantic and intelligent summarization of the calendar content items.

According to the embodiment shown in FIG. 7, the map calendar 700 is used to render time according to two separate calendar systems, i.e., the PST calendar system and the JST calendar system. Specifically, as shown in the header section 710, the map calendar 700 renders time according to the PST calendar system before the "Fly to Tokyo" travel-type calendar content item 702A and after the "Fly home" travel-type calendar content item 702D. However, the map calendar 700 renders time according to the JST calendar system for all calendar content items 702B, 702C, 704A, 704B, 706A, 706B, 706C, and 706D occurring between the "Fly to Tokyo" and "Fly home" travel-type calendar content items 702A and 702D. In this manner, the user is able to view his calendar according to the Japanese time zone during his trip to Japan, while still viewing his normal schedule according to the time zone in which he normally resides. This enables the user to seamlessly plan his trip without having to manually account for time zones changes.

Moreover, according to embodiments described herein, the user may easily adjust the manner in which different time units are rendered. For example, if the user wishes to view his trip itinerary according to the PST calendar system, the user may simply highlight the units of time corresponding to the trip and then select the PST calendar system from a drop-down menu. Alternatively, the user may choose to view the trip itinerary relative to both the PST calendar system and the JST calendar system simultaneously in a side-by-side or overlapping manner.

Exemplary Computing Environment for Implementing Techniques Described Herein

Figure 8:
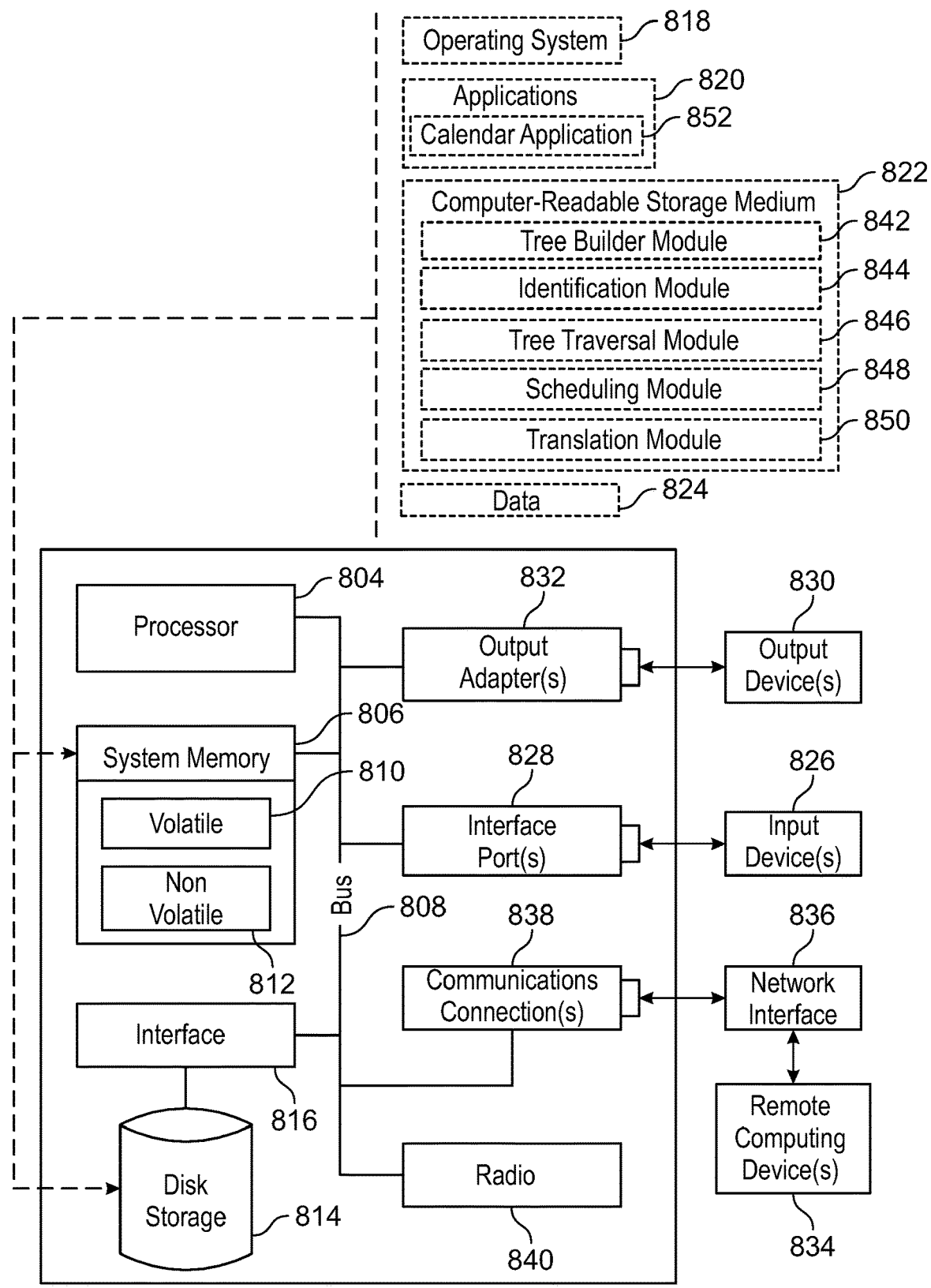
FIG. 8 is a block diagram of an exemplary computing system that can be used to implement the techniques described herein.

FIG. 8 is a block diagram of an exemplary computing system 800 that can be used to implement the techniques described herein. The exemplary computing system 800 includes a processor 804, a system memory 806, and a system bus 808. In some examples, the computing system 800 is a gaming console, a personal computer (PC), an accessory console, or a gaming controller, among other computing systems. In some examples, the computing system 800 is a node in a cloud network.

The system bus 808 couples system components including, but not limited to, the system memory 806 to the processor 804. The processor 804 can be any of various available processors. Dual microprocessors and other multiprocessor architectures also can be employed as the processor 804. The system bus 808 can be any of several types of bus structure, including the memory bus or memory controller, a peripheral bus or external bus, and a local bus using any variety of available bus architectures known to those of ordinary skill in the art. The system memory 806 includes computer-readable storage media that includes volatile memory 810 and nonvolatile memory 812.

In some embodiments, a unified extensible firmware interface (UEFI) manager or a basic input/output system (BIOS), containing the basic routines to transfer information between elements within the computing system 800, such as during start-up, is stored in nonvolatile memory 812. By way of illustration, and not limitation, nonvolatile memory 812 can include read-only memory (ROM), programmable ROM (PROM), electrically programmable ROM (EPROM), electrically erasable programmable ROM (EEPROM), or flash memory.

Volatile memory 810 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), SynchLink™ DRAM (SLDRAM), Rambus® direct RAM (RDRAM), direct Rambus® dynamic RAM (DRDRAM), and Rambus® dynamic RAM (RDRAM).

The computing system 800 also includes other computer-readable storage media, such as removable/non-removable, volatile/non-volatile computer-readable storage media. FIG. 8 shows, for example a disk storage 814. In embodiments, the disk storage 814 may include a calendar content database that is to store at least one item of calendar content. Disk storage 814 includes, but is not limited to, devices like a magnetic disk drive, floppy disk drive, tape drive, Jaz drive, Zip drive, LS-210 drive, flash memory card, or memory stick.

In addition, disk storage 814 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 814 to the system bus 808, a removable or non-removable interface is typically used such as interface 816.

It is to be appreciated that FIG. 8 describes software that acts as an intermediary between users and the basic computer resources described in the suitable operating environment 800. Such software includes an operating system 818. Operating system 818, which can be stored on disk storage 814, acts to control and allocate resources of the computing system 800.

System applications 820 take advantage of the management of resources by operating system 818 through program modules stored within a computer-readable storage medium 822 and program data 824 stored either in system memory 806 or on disk storage 814. Moreover, it is to be appreciated that the disclosed subject matter can be implemented with various operating systems or combinations of operating systems.

A user enters commands or information into the computing system 800 through input devices 826. Input devices 826 include, but are not limited to, a pointing device, such as, a mouse, trackball, stylus, and the like, a keyboard, a microphone, a joystick, a satellite dish, a scanner, a TV tuner card, a digital camera, a digital video camera, a web camera, any suitable dial accessory (physical or virtual), and the like. In some examples, an input device can include Natural User Interface (NUI) devices. NUI refers to any interface technology that enables a user to interact with a device in a "natural" manner, free from artificial constraints imposed by input devices such as mice, keyboards, remote controls, and the like. In some examples, NUI devices include devices relying on speech recognition, touch and stylus recognition, gesture recognition both on screen and adjacent to the screen, air gestures, head and eye tracking, voice and speech, vision, touch, gestures, and machine intelligence. For example, NUI devices can include touch sensitive displays, voice and speech recognition, intention and goal understanding, and motion gesture detection using depth cameras such as stereoscopic camera systems, infrared camera systems, RGB camera systems and combinations of these. NUI devices can also include motion gesture detection using accelerometers or gyroscopes, facial recognition, three-dimensional (3D) displays, head, eye, and gaze tracking, immersive augmented reality and virtual reality systems, all of which provide a more natural interface. NUI devices can also include technologies for sensing brain activity using electric field sensing electrodes. For example, a NUI device may use Electroencephalography (EEG) and related methods to detect electrical activity of the brain. The input devices 826 connect to the processor 804 through the system bus 808 via interface ports 828. Interface ports 828 include, for example, a serial port, a parallel port, a game port, and a universal serial bus (USB).

Output devices 830 use some of the same type of ports as input devices 826. Thus, for example, a USB port may be used to provide input to the computing system 800 and to output information from the computing system 800 to an output device 830.

Output adapter 832 is provided to illustrate that there are some output devices 830 like monitors, speakers, and printers, among other output devices 830, which are accessible via adapters. The output adapters 832 include, by way of illustration and not limitation, video and sound cards that provide a means of connection between the output device 830 and the system bus 808. It can be noted that other devices and systems of devices provide both input and output capabilities such as remote computing devices 834.

The computing system 800 can be a server hosting various software applications in a networked environment using logical connections to one or more remote computers, such as remote computing devices 834. The remote computing devices 834 may be client systems configured with web browsers, PC applications, mobile phone applications, and the like. The remote computing devices 834 can be a personal computer, a server, a router, a network PC, a workstation, a microprocessor-based appliance, a mobile phone, a peer device or other common network node and the like, and typically includes many or all of the elements described relative to the computing system 800.

Remote computing devices 834 can be logically connected to the computing system 800 through a network interface 836 and then connected via a communication connection 838, which may be wireless. Network interface 836 encompasses wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection 838 refers to the hardware/software employed to connect the network interface 836 to the bus 808. While communication connection 838 is shown for illustrative clarity as residing inside the computing system 800, it can also be external to the computing system 800. The hardware/software for connection to the network interface 836 may include, for exemplary purposes, internal and external technologies such as, mobile phone switches, modems including regular telephone grade modems, cable modems and DSL modems, ISDN adapters, and Ethernet cards.

The computing system 800 can further include a radio 840. For example, the radio 840 can be a wireless local area network radio that may operate one or more wireless bands. For example, the radio 840 can operate on the industrial, scientific, and medical (ISM) radio band at 2.4 GHz or 5 GHz. In some examples, the radio 840 can operate on any suitable radio band at any radio frequency.

In various embodiments, the computing system 800 includes (or is operatively coupled to) a computer-readable storage medium 822 including one or more modules, such as a tree builder module 842, an identification module 844, a tree traversal module 846, a scheduling module 848, and a translation module 850. In various embodiments, the modules 842, 844, 846, 848, and 850 cause the processor 804 to perform operations that result in the execution of the method 500 for enabling time as data, as described with respect to FIG. 5, and/or the method 600 for translating time between multiple calendar systems, as described with respect to FIG. 6. Moreover, in various embodiments, such operations may be executed by, or in conjunction with, a calendar application 852, such as a digital map calendar application, as described herein.

It is to be understood that the block diagram of FIG. 8 is not intended to indicate that the computing system 800 is to include all of the components shown in FIG. 8. Rather, the computing system 800 can include fewer or additional components not illustrated in FIG. 8 (e.g., additional applications, additional modules, additional memory devices, additional network interfaces, etc.). Furthermore, any of the functionalities of the modules 842, 844, 846, 848, and/or 850 may be partially, or entirely, implemented in hardware and/or in the processor 804. For example, the functionality may be implemented with an application specific integrated circuit, in logic implemented in the processor 804, or in any other device.

Figure 9:
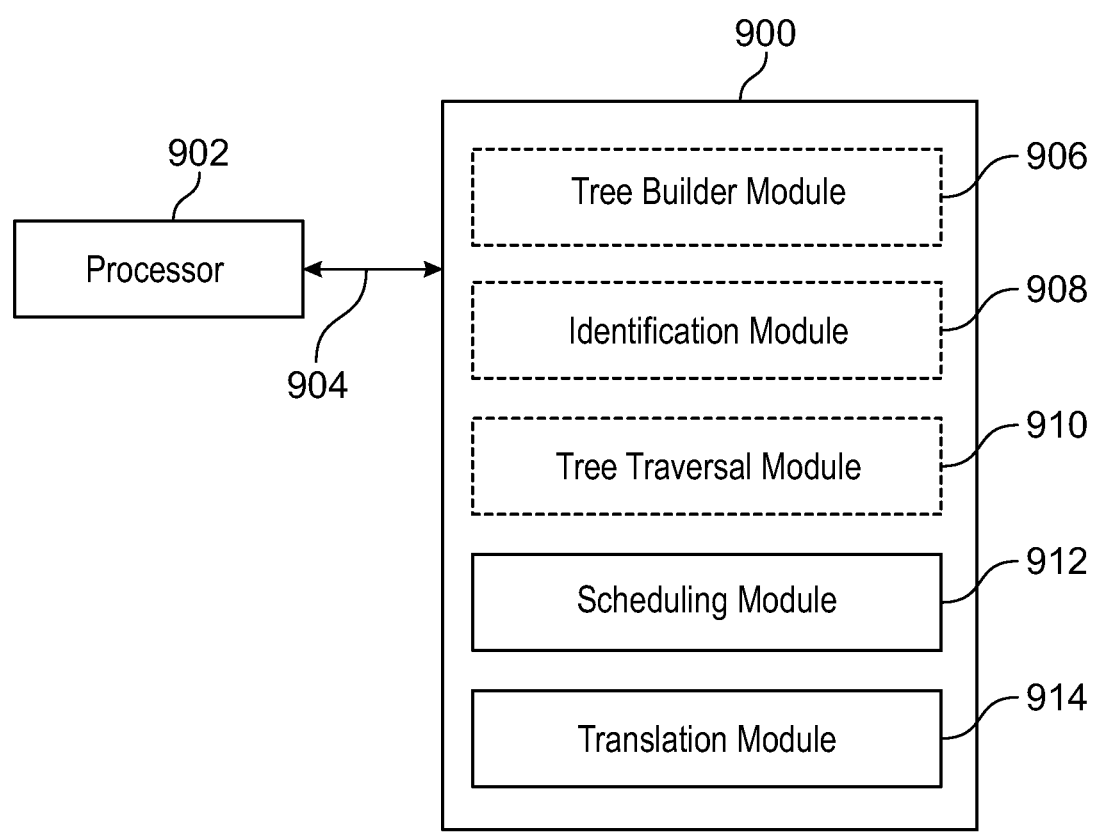
FIG. 9 illustrates a block diagram of an exemplary computer-readable storage medium for enabling the representation of time as data, as well as the translation of time between calendar systems.

FIG. 9 illustrates a block diagram of an exemplary computer-readable storage medium 900 for enabling the representation of time as data, as well as the translation of time between calendar systems. In various embodiments, the computer-readable storage medium 900 is accessed by a processor 902 over a computer interconnect 904. For example, the computer-readable storage medium 900 may be the same as, or similar to, the computer-readable storage medium 822 described with respect to the computing system 800 of FIG. 8 and, thus, the computer-readable storage medium 900 may be accessed by the processor 804 of the computing system 800.

In various embodiments, the computer-readable storage medium 900 includes code (i.e., computer-executable instructions) to direct the processor 802 to perform the operations of the present techniques. Such code may be stored within the computer-readable storage medium 900 in the form of modules, where each module includes a set of computer-executable instructions that, when executed by the processor 902, cause the processor 902 to perform a corresponding set of operations. For example, an optional tree builder module 906 may direct the processor 902 to construct tree structures for particular calendar systems; an optional identification module 908 may direct the processor 902 to assign node identifications to nodes of the tree structures; an optional tree traversal module 910 may direct the processor to traverse any of the tree structures according to a tree traversal algorithm; a scheduling module 912 may direct the processor 902 to schedule calendar content items corresponding to time fragments relative to the universal time (and/or relative to a particular calendar system); and a translation module 914 may direct the processor 902 to translate the calendar content items between calendar systems. Accordingly, in various embodiments, such modules may cause the processor 902 to perform any of the techniques described herein, such as the method 500 described with respect to FIG. 5 and/or the method 600 described with respect to FIG. 6.

Moreover, it is to be understood that any suitable number of the software components shown in FIG. 9 may be included within the computer-readable storage medium 900. Furthermore, any number of additional software components not shown in FIG. 9 may be included within the computer-readable storage medium 900, depending on the details of the specific implementation.

Furthermore, it should be noted that, while the methods and processes described herein are generally expressed in regard to discrete steps, these steps should be viewed as being logical in nature and may or may not correspond to any specific actual and/or discrete steps of a given implementation. In addition, the order in which these steps are presented in the various methods and processes, unless otherwise indicated, should not be construed as the only order in which the steps may be carried out. Moreover, in some instances, some of these steps may be combined and/or omitted. Those skilled in the art will recognize that the logical presentation of steps is sufficiently instructive to carry out aspects of the claimed subject matter irrespective of any particular development or coding language in which the logical instructions/steps are encoded.

Of course, while the methods and processes described herein include various novel features of the disclosed subject matter, other steps (not listed) may also be carried out in the execution of the subject matter set forth in these methods and processes. Those skilled in the art will appreciate that the logical steps of these methods and processes may be combined together or split into additional steps. Steps of the above-described methods and processes may be carried out in parallel or in series. Often, but not exclusively, the functionality of a particular method or process is embodied in software (e.g., applications, system services, libraries, and the like) that is executed on one or more processors of computing systems. Additionally, in various embodiments, all or some of the various methods and processes may also be embodied in executable hardware modules including, but not limited to, system on chips (SoC's), codecs, specially designed processors and/or logic circuits, and the like, on a computing system.

As suggested above, each method or process described herein is typically embodied within computer-executable instruction (or code) modules including individual routines, functions, looping structures, selectors and switches (such as if-then and if-then-else statements), assignments, arithmetic computations, and the like, that, in execution, configure a computing system to operate in accordance with the particular method or process However, as suggested above, the exact implementation in executable statement of each of the methods or processes is based on various implementation configurations and decisions, including programming languages, compilers, target processors, operating environments, and the linking or binding operation. Those skilled in the art will readily appreciate that the logical steps identified in these methods and processes may be implemented in any number of ways and, thus, the logical descriptions set forth above are sufficiently enabling to achieve similar results.

While various novel aspects of the disclosed subject matter have been described, it should be appreciated that these aspects are exemplary and should not be construed as limiting. Variations and alterations to the various aspects may be made without departing from the scope of the disclosed subject matter.

EXAMPLES

Example 1 is a computer-implemented method for translating time between calendar systems. The method includes accessing a first tree structure for a first calendar system, wherein data corresponding to the first tree structure include time intervals for the first calendar system that are arranged into layers of nodes, and wherein the layers of nodes are mapped to universal time. The method also includes scheduling a calendar content item corresponding to a time fragment relative to the universal time, as well as translating the calendar content item to a first human-readable time fragment for the first calendar system by traversing the first tree structure to convert the time fragment to the first human-readable time fragment based on the mapping of the layers of nodes of the first tree structure to the universal time.

Example 2 includes the method of example 1, including or excluding optional features. In this example, the method includes accessing a second tree structure for a second calendar system, wherein data corresponding to the second tree structure include time intervals for the second calendar system that are arranged into layers of nodes, and wherein the layers of nodes are mapped to universal time. In this example, the method also includes translating the calendar content item to a second human-readable time fragment for the second calendar system by traversing the second tree structure to convert the time fragment to the second human-readable time fragment based on the mapping of the layers of nodes of the second tree structure to the universal time.

Example 3 includes the method of example 2, including or excluding optional features. In this example, the method includes displaying a representation of the calendar content item relative to at least one of the first human-readable time fragment or the second human-readable time fragment.

Example 4 includes the method of example 3, including or excluding optional features. In this example, the method includes displaying the representation of the calendar content item based on a map calendar, wherein the map calendar includes a continuous, manipulable sequence of data organized as units of time within a coordinate plane.

Example 5 includes the method of any one of examples 1 to 4, including or excluding optional features. In this example, the method includes constructing the first tree structure for the first calendar system such that layers of the first tree structure below a root node include identical sibling nodes for layers above a threshold interval size that is a smallest repeatable unit of time according to the first calendar system, as well as assigning node identifications to the nodes of the first tree structure such that the time interval for each node in the layers of the first tree structure above the threshold interval size for the first calendar system is a repeatable unit of time and the time interval for each node in the layers of the first tree structure below the threshold interval size for the first calendar system varies according to leap values.

Example 6 includes the method of any one of examples 1 to 5, including or excluding optional features. In this example, the method includes accessing a second tree structure for a second calendar system, wherein data corresponding to the second tree structure include time intervals for the second calendar system that are arranged into layers of nodes, and wherein the layers of nodes are mapped to universal time. In this example, the method also includes scheduling a second calendar content item corresponding to a second time fragment relative to the second calendar system, as well as translating the second calendar content item to a second human-readable time fragment for the first calendar system by traversing the second tree structure corresponding to the second calendar system to convert the second time fragment to a corresponding universal time based on the mapping of the layers of nodes of the second tree structure to the universal time and traversing the first tree structure corresponding to the first calendar system to convert the universal time corresponding to the second time fragment to the second human-readable time fragment based on the mapping of the layers of nodes of the first tree structure to the universal time.

Example 7 includes the method of any one of examples 1 to 6, including or excluding optional features. In this example, the method includes accessing a second tree structure for a second calendar system, wherein data corresponding to the second tree structure include time intervals for the second calendar system that are arranged into layers of nodes, and wherein the layers of nodes are mapped to universal time. In this example, the method also includes scheduling the calendar content item corresponding to the time fragment relative to the universal time and a second calendar content item corresponding to a second time fragment relative to the universal time, as well as translating the calendar content item to the first human-readable time fragment for the first calendar system by traversing the first tree structure corresponding to the first calendar system to convert the time fragment to the first human-readable time fragment based on the mapping of the layers of nodes of the first tree structure to the universal time. In this example, the method further includes translating the second calendar content item to a second human-readable time fragment for a second calendar system by traversing the second tree structure corresponding to the second calendar system to convert the time fragment to the second human-readable time fragment based on the mapping of the layers of nodes of the second tree structure to the universal time, as well as simultaneously displaying a first representation of the calendar content item relative to the first human-readable time fragment and a second representation of the second calendar content item relative to the second human-readable time fragment.

Example 8 includes the method of any one of examples 1 to 7, including or excluding optional features. In this example, the method includes displaying a representation of the calendar content item relative to the first human-readable time fragment and displaying a representation of time fragments that occur before and/or after the calendar content item, as measured based on the universal time, relative to at least one other calendar system.

Example 9 is a computing system including a processor for executing computer-executable instructions. The computer-executable instructions cause the processor to access a first tree structure for a first calendar system, wherein data corresponding to the first tree structure include time intervals for the first calendar system that are arranged into layers of nodes, and wherein the layers of nodes are mapped to universal time. The computer-executable instructions also cause the processor to schedule a calendar content item corresponding to a time fragment relative to the universal time and translate the calendar content item to a first human-readable time fragment for the first calendar system by traversing the first tree structure to convert the time fragment to the first human-readable time fragment based on the mapping of the layers of nodes of the first tree structure to the universal time.

Example 10 includes the computing system of example 9, including or excluding optional features. In this example, the computer-executable instructions cause the processor to access a second tree structure for a second calendar system, wherein data corresponding to the second tree structure include time intervals for the second calendar system that are arranged into layers of nodes, and wherein the layers of nodes are mapped to universal time. In this example, the computer-executable instructions also cause the processor to translate the calendar content item to a second human-readable time fragment for the second calendar system by traversing the second tree structure to convert the time fragment to the second human-readable time fragment based on the mapping of the layers of nodes of the second tree structure to the universal time.

Example 11 includes the computing system of example 10, including or excluding optional features. In this example, the computer-executable instructions further cause the processor to display a representation of the calendar content item relative to at least one of the first human-readable time fragment or the second human-readable time fragment.

Example 12 includes the computing system of example 11, including or excluding optional features. In this example, the computer-executable instructions cause the processor to display the representation of the calendar content item based on a map calendar, wherein the map calendar includes a continuous, manipulable sequence of data organized as units of time within a coordinate plane.

Example 13 includes the computing system of any one of examples 9 to 12, including or excluding optional features. In this example, the computer-executable instructions cause the processor to construct the first tree structure for the first calendar system such that layers of the first tree structure below a root node include identical sibling nodes for layers above a threshold interval size that is a smallest repeatable unit of time according to the first calendar system. In this example, the computer-executable instructions also cause the processor to assign node identifications to the nodes of the first tree structure such that the time interval for each node in the layers of the first tree structure above the threshold interval size for the first calendar system is a repeatable unit of time and the time interval for each node in the layers of the first tree structure below the threshold interval size for the first calendar system varies according to leap values.

Example 14 includes the computing system of any one of examples 9 to 13, including or excluding optional features. In this example, the computer-executable instructions cause the processor to access a second tree structure for a second calendar system, wherein data corresponding to the second tree structure include time intervals for the second calendar system that are arranged into layers of nodes, and wherein the layers of nodes are mapped to universal time. In this example, the computer-executable instructions also cause the processor to schedule a second calendar content item corresponding to a second time fragment relative to the second calendar system and translate the second calendar content item to a second human-readable time fragment for the first calendar system by traversing the second tree structure corresponding to the second calendar system to convert the second time fragment to a corresponding universal time based on the mapping of the layers of nodes of the second tree structure to the universal time and traversing the first tree structure corresponding to the first calendar system to convert the universal time corresponding to the second time fragment to the second human-readable time fragment based on the mapping of the layers of nodes of the first tree structure to the universal time.

Example 15 includes the computing system of any one of examples 9 to 14, including or excluding optional features. In this example, the computer-executable instructions cause the processor to access a second tree structure for a second calendar system, wherein data corresponding to the second tree structure include time intervals for the second calendar system that are arranged into layers of nodes, and wherein the layers of nodes are mapped to universal time. In this example, the computer-executable instructions also cause the processor to schedule the calendar content item corresponding to the time fragment relative to the universal time and a second calendar content item corresponding to a second time fragment relative to the universal time and translate the calendar content item to the first human-readable time fragment for the first calendar system by traversing the first tree structure corresponding to the first calendar system to convert the time fragment to the first human-readable time fragment based on the mapping of the layers of nodes of the first tree structure to the universal time. In this example, the computer-executable instructions further cause the processor to translate the second calendar content item to a second human-readable time fragment for a second calendar system by traversing the second tree structure corresponding to the second calendar system to convert the time fragment to the second human-readable time fragment based on the mapping of the layers of nodes of the second tree structure to the universal time and simultaneously display a first representation of the calendar content item relative to the first human-readable time fragment and a second representation of the second calendar content item relative to the second human-readable time fragment.

Example 16 includes the computing system of example 9, including or excluding optional features. In this example, the computer-executable instructions cause the processor to display a representation of the calendar content item relative to the first human-readable time fragment and display a representation of time fragments that occur before and/or after the calendar content item, as measured based on the universal time, relative to at least one other calendar system.

Example 17 is a computer-readable storage medium including computer-executable instructions that, when executed by a processor, cause the processor to access a first tree structure for a first calendar system, wherein data corresponding to the first tree structure include time intervals for the first calendar system that are arranged into layers of nodes, and wherein the layers of nodes are mapped to universal time. The computer-readable storage medium includes computer-executable instructions that, when executed by the processor, also cause the processor to schedule a calendar content item corresponding to a time fragment relative to the universal time and translate the calendar content item to a first human-readable time fragment for the first calendar system by traversing the first tree structure to convert the time fragment to the first human-readable time fragment based on the mapping of the layers of nodes of the first tree structure to the universal time.

Example 18 includes the computer-readable storage medium of example 17, including or excluding optional features. In this example, the computer-readable storage medium includes computer-executable instructions that, when executed by the processor, cause the processor to access a second tree structure for a second calendar system, wherein data corresponding to the second tree structure include time intervals for the second calendar system that are arranged into layers of nodes, and wherein the layers of nodes are mapped to universal time. The computer-readable storage medium also includes computer-executable instructions that, when executed by the processor, cause the processor to translate the calendar content item to a second human-readable time fragment for the second calendar system by traversing the second tree structure to convert the time fragment to the second human-readable time fragment based on the mapping of the layers of nodes of the second tree structure to the universal time.

Example 19 includes the computer-readable storage medium of example 18, including or excluding optional features. In this example, the computer-readable storage medium includes computer-executable instructions that, when executed by the processor, cause the processor to display a representation of the calendar content item relative to at least one of the first human-readable time fragment or the second human-readable time fragment.

Example 20 includes the computer-readable storage medium of example 19, including or excluding optional features. In this example, the computer-readable storage medium includes computer-executable instructions that, when executed by the processor, cause the processor to display the representation of the calendar content item based on a map calendar, wherein the map calendar includes a continuous, manipulable sequence of data organized as units of time within a coordinate plane.

In particular and in regard to the various functions performed by the above described components, devices, circuits, systems and the like, the terms (including a reference to a "means") used to describe such components are intended to correspond, unless otherwise indicated, to any component which performs the specified function of the described component, e.g., a functional equivalent, even though not structurally equivalent to the disclosed structure, which performs the function in the herein illustrated exemplary aspects of the claimed subject matter. In this regard, it will also be recognized that the innovation includes a system as well as a computer-readable storage media having computer-executable instructions for performing the acts and events of the various methods of the claimed subject matter.

There are multiple ways of implementing the claimed subject matter, e.g., an appropriate API, tool kit, driver code, operating system, control, standalone or downloadable software object, etc., which enables applications and services to use the techniques described herein. The claimed subject matter contemplates the use from the standpoint of an API (or other software object), as well as from a software or hardware object that operates according to the techniques set forth herein. Thus, various implementations of the claimed subject matter described herein may have aspects that are wholly in hardware, partly in hardware and partly in software, as well as in software.

The aforementioned systems have been described with respect to interaction between several components. It can be appreciated that such systems and components can include those components or specified sub-components, some of the specified components or sub-components, and additional components, and according to various permutations and combinations of the foregoing. Sub-components can also be implemented as components communicatively coupled to other components rather than included within parent components (hierarchical).

Additionally, it can be noted that one or more components may be combined into a single component providing aggregate functionality or divided into several separate sub-components, and any one or more middle layers, such as a management layer, may be provided to communicatively couple to such sub-components in order to provide integrated functionality. Any components described herein may also interact with one or more other components not specifically described herein but generally known by those of skill in the art.

In addition, while a particular feature of the claimed subject matter may have been disclosed with respect to one of several implementations, such feature may be combined with one or more other features of the other implementations as may be desired and advantageous for any given or particular application. Furthermore, to the extent that the terms "includes," "including," "has," "contains," variants thereof, and other similar words are used in either the detailed description or the claims, these terms are intended to be inclusive in a manner similar to the term "comprising" as an open transition word without precluding any additional or other elements.

What is claimed is:

1. A computer-implemented method for translating time between calendar systems, comprising:
    constructing a first tree structure for a first calendar system, wherein data corresponding to the first tree structure comprise time intervals for the first calendar system that are arranged into layers of nodes, wherein the layers of nodes are mapped to universal time, and wherein the first tree structure is constructed such that layers of the first tree structure below a root node comprise identical sibling nodes for layers above a threshold interval size that is a smallest repeatable unit of time according to the first calendar system;
    assigning node identifications to the nodes of the first tree structure such that the time interval for each node in the layers of the first tree structure above the threshold interval size for the first calendar system is a repeatable unit of time and the time interval for each node in the layers of the first tree structure below the threshold interval size for the first calendar system varies according to leap values;
    accessing, via digital map calendar application executing on a computing system, the first tree structure for three first calendar system;
    scheduling, via the digital map calendar application, a calendar content item corresponding to a time fragment relative to the universal time;
    translating, via the digital map calendar application, the calendar content item to a first human-readable time fragment for the first calendar system by traversing the first tree structure to convert the time fragment to the first human-readable time fragment based on the mapping of the layers of nodes of the first tree structure to the universal time; and
    causing display, via a digital map calendar user interface of the digital map calendar application, of a representation of the calendar content item relative to the first human-readable time fragment based on a map calendar, wherein the organized as units of time within a coordinate plane.

2. The computer-implemented method of claim 1, comprising:
    accessing a second tree structure for a second calendar system, wherein data corresponding to the second tree structure comprise time intervals for the second calendar system that are arranged into layers of nodes, and wherein the layers of nodes are mapped to universal time; and
    translating the calendar content item to a second human-readable time fragment for the second calendar system by traversing the second tree structure to convert the time fragment to the second human-readable time fragment based on the mapping of the layers of nodes of the second tree structure to the universal time.

3. The computer-implemented method of claim 2, comprising causing display of a second representation of the calendar content item relative to the second human-readable time fragment based on the map calendar.

4. The computer-implemented method of claim 1, comprising:
    accessing a second tree structure for a second calendar system, wherein data corresponding to the second tree structure comprise time intervals for the second calendar system that are arranged into layers of nodes, and wherein the layers of nodes are mapped to universal time;
    scheduling a second calendar content item corresponding to a second time fragment relative to the second calendar system; and
    translating the second calendar content item to a second human-readable time fragment for the first calendar system by:
        traversing the second tree structure corresponding to the second calendar system to convert the second time fragment to a corresponding universal time based on the mapping of the layers of nodes of the second tree structure to the universal time; and
        traversing the first tree structure corresponding to the first calendar system to convert the universal time corresponding to the second time fragment to the second human-readable time fragment based on the mapping of the layers of nodes of the first tree structure to the universal time.

5. The computer-implemented method of claim 1, further comprising:
    accessing a second tree structure for a second calendar system, wherein data corresponding to the second tree structure comprise time intervals for the second calendar system that are arranged into layers of nodes, and wherein the layers of nodes are mapped to universal time;
    scheduling the calendar content item corresponding to the time fragment relative to the universal time and a second calendar content item corresponding to a second time fragment relative to the universal time;
    translating the calendar content item to the first human-readable time fragment for the first calendar system by traversing the first tree structure corresponding to the first calendar system to convert the time fragment to the first human-readable time fragment based on the mapping of the layers of nodes of the first tree structure to the universal time;
    translating the second calendar content item to a second human-readable time fragment for a second calendar system by traversing the second tree structure corresponding to the second calendar system to convert the time fragment to the second human-readable time fragment based on the mapping of the layers of nodes of the second tree structure to the universal time; and
    simultaneously causing display of the representation of the calendar content item relative to the first human-readable time fragment and a second representation of the second calendar content item relative to the second human-readable time fragment.

6. The computer-implemented method of claim 1, further comprising:
causing display of a representation of time fragments that occur before and/or after the calendar content item, as measured based on the universal time, relative to at least one other calendar system.

7. A computing system, comprising a processor for executing computer-executable instructions that cause the processor to:
construct a first tree structure for a first calendar system, wherein data corresponding to the first tree structure comprise time intervals for the first calendar system that are arranged into layers of nodes, wherein the layers of nodes are mapped to universal time, and wherein the first tree structure is constructed such that such that layers of the first tree structure below a root node comprise identical sibling nodes for layers above a threshold interval size that is a smallest repeatable unit of time according to the first calendar system;
assign node identifications to the nodes of the first tree structure such that the time interval for each node in the layers of the first tree structure above the threshold interval size for the first calendar system is a repeatable unit of time and the time interval for each node in the layers of the first tree structure below the threshold interval size for the first calendar system varies according to leap values;
access, via digital map calendar application executing on the computing system, the first tree structure for the first calendar system;
schedule, via the digital map calendar application, a calendar content item corresponding to a time fragment relative to the universal time;
translate, via the digital map calendar application, the calendar content item to a first human-readable time fragment for the first calendar system by traversing the first tree structure to convert the time fragment to the first human-readable time fragment based on the mapping of the layers of nodes of the first tree structure to the universal time; and
cause display, via a digital map calendar user interface of the digital map calendar application, of a representation of the calendar content item relative to the first human-readable time fragment based on a map calendar, wherein the map calendar comprises a continuous, manipulable sequence of data organized as units of time within a coordinate plane.

8. The computing system of claim 7, wherein the computer-executable instructions cause the processor to:
access a second tree structure for a second calendar system, wherein data corresponding to the second tree structure comprise time intervals for the second calendar system that are arranged into layers of nodes, and wherein the layers of nodes are mapped to universal time; and
translate the calendar content item to a second human-readable time fragment for the second calendar system by traversing the second tree structure to convert the time fragment to the second human-readable time fragment based on the mapping of the layers of nodes of the second tree structure to the universal time.

9. The computing system of claim 8, wherein the computer-executable instructions further cause the processor to cause display of a second representation of the calendar content item relative to the second human-readable time fragment based on the map calendar.

10. The computing system of claim 7, wherein the computer-executable instructions further cause the processor to:
access a second tree structure for a second calendar system, wherein data corresponding to the second tree structure comprise time intervals for the second calendar system that are arranged into layers of nodes, and wherein the layers of nodes are mapped to universal time;
schedule a second calendar content item corresponding to a second time fragment relative to the second calendar system; and
translate the second calendar content item to a second human-readable time fragment for the first calendar system by:
traversing the second tree structure corresponding to the second calendar system to convert the second time fragment to a corresponding universal time based on the mapping of the layers of nodes of the second tree structure to the universal time; and
traversing the first tree structure corresponding to the first calendar system to convert the universal time corresponding to the second time fragment to the second human-readable time fragment based on the mapping of the layers of nodes of the first tree structure to the universal time.

11. The computing system of claim 7, wherein the computer-executable instructions further cause the processor to:
access a second tree structure for a second calendar system, wherein data corresponding to the second tree structure comprise time intervals for the second calendar system that are arranged into layers of nodes, and wherein the layers of nodes are mapped to universal time;
schedule the calendar content item corresponding to the time fragment relative to the universal time and a second calendar content item corresponding to a second time fragment relative to the universal time;
translate the calendar content item to the first human-readable time fragment for the first calendar system by traversing the first tree structure corresponding to the first calendar system to convert the time fragment to the first human-readable time fragment based on the mapping of the layers of nodes of the first tree structure to the universal time;
translate the second calendar content item to a second human-readable time fragment for a second calendar system by traversing the second tree structure corresponding to the second calendar system to convert the time fragment to the second human-readable time fragment based on the mapping of the layers of nodes of the second tree structure to the universal time; and
simultaneously cause display of the representation of the calendar content item relative to the first human-readable time fragment and a second representation of the second calendar content item relative to the second human-readable time fragment.

12. The computing system of claim 7, wherein the computer-executable instructions cause the processor to:
cause display of a representation of time fragments that occur before and/or after the calendar content item, as measured based on the universal time, relative to at least one other calendar system.

13. A computer-readable storage media comprising computer-executable instructions that, when executed by a processor, cause the processor to:

construct a first tree structure for a first calendar system, wherein data corresponding to the first tree structure comprise time intervals for the first calendar system that are arranged into layers of nodes, wherein the layers of nodes are mapped to universal time, and wherein the first tree structure is constructed such that such that layers of the first tree structure below a root node comprise identical sibling nodes for layers above a threshold interval size that is a smallest repeatable unit of time according to the first calendar system; assign node identifications to the nodes of the first tree structure such that the time interval for each node in the layers of the first tree structure above the threshold interval size for the first calendar system is a repeatable unit of time and the time interval for each node in the layers of the first tree structure below the threshold interval size for the first calendar svstem varies according to leap values;

access, via a digital map calendar application executing on a computing system, the first tree structure for the first calendar system;

schedule, via the digital map calendar application, a calendar content item corresponding to a time fragment relative to the universal time;

translate, via the digital map calendar application, the calendar content item to a first human-readable time fragment for the first calendar system by traversing the first tree structure to convert the time fragment to the first human-readable time fragment based on the mapping of the layers of nodes of the first tree structure to the universal time; and cause display, via a digital map calendar user interface of the digital map calendar application, of a representation of the calendar content item relative to the first human-readable time fragment based on a map calendar, wherein the map calendar comprises a continuous, manipulable sequence of data organized as units of time within a coordinate plane.

14. The computer-readable storage media of claim 13, wherein the computer-readable storage medium comprises computer-executable instructions that, when executed by the processor, cause the processor to:

access a second tree structure for a second calendar system, wherein data corresponding to the second tree structure comprise time intervals for the second calendar system that are arranged into layers of nodes, and wherein the layers of nodes are mapped to universal time; and translate the calendar content item to a second human-readable time fragment for the second calendar system by traversing the second tree structure to convert the time fragment to the second human-readable time fragment based on the mapping of the layers of nodes of the second tree structure to the universal time.

15. The computer-readable storage media of claim 13, wherein the computer-readable storage medium comprises computer-executable instructions that, when executed by the processor, cause the processor to cause display of a second representation of the calendar content item relative to the second human-readable time fragment based on the map calendar.

16. The computer-readable storage media of claim 13, wherein the computer-reada ble storage medium comprises computer-executable instructions that, when executed by the processor, cause the processor to:

access a second tree structure for a second calendarsystem, wherein data corresponding to the second tree structure comprise time intervals for the second calendar system that are arranged into layers of nodes, and wherein the layers of nodes are mapped to universal time;

schedule a second calendar content item corresponding to a second time fragment relative to the second calendarsystem; and translate the second calendar content item to a second human-readable time fragment for the first calendar system by:

traversing the second tree structure corresponding to the second calendar system to convert the second time fragment to a corresponding universal time based on the mapping of the layers of nodes of the second tree structure to the universal time; and traversing the first tree structure corresponding to the first calendarsystem to convert the universal time corresponding to the second time fragment to the second human-readable time fragment based on the mapping of the layers of nodes of the first tree structure to the universal time.

17. The computer-readable storage media of claim 13, wherein the computer-readable storage medium comprises computer-executable instructions that, when executed by the processor, cause the processor to:

access a second tree structure for a second calendar system, wherein data corresponding to the second tree structure comprise time intervals for the second calendar system that are arranged into layers of nodes, and wherein the layers of nodes are mapped to universal time;

schedule the calendar content item corresponding to the time fragment relative to the universal time and a second calendar content item corresponding to a second time fragment relative to the universal time;

translate the calendar content item to the first human-readable time fragment for the first calendar system by traversing the first tree structure corresponding to the first calendar system to convert the time fragment to the first human-readable time fragment based on the mapping of the layers of nodes of the first tree structure to the universal time;

translate the second calendar content item to a second human-readable time fragment for a second calendar system by traversing the second tree structure corresponding to the second calendar system to convert the time fragment to the second human-readable time fragment based on the mapping of the layers of nodes of the second tree structure to the universal time; and simultaneously cause display of the representation of the calendar content item relative to the first human-readable time fragment and a second representation of the second calendar content item relative to the second human-readable time fragment.

\* \* \* \* \*